United States Patent
Yoshida

(10) Patent No.: US 12,095,961 B2
(45) Date of Patent: Sep. 17, 2024

(54) OUTPUT SYSTEM CAPABLE OF OUTPUTTING JOB USING ACQUIRED DESTINATION INFORMATION

(71) Applicant: SHARP KABUSHIKI KAISHA, Sakai (JP)

(72) Inventor: Mayuko Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/097,179

(22) Filed: Jan. 13, 2023

(65) Prior Publication Data

US 2023/0239418 A1 Jul. 27, 2023

(30) Foreign Application Priority Data

Jan. 27, 2022 (JP) ................................. 2022-010884

(51) Int. Cl.
*H04N 1/32* (2006.01)
*H04N 1/00* (2006.01)

(52) U.S. Cl.
CPC ..... *H04N 1/32096* (2013.01); *H04N 1/00236* (2013.01); *H04N 1/00331* (2013.01); *H04N 1/00334* (2013.01); *H04N 1/00411* (2013.01); *H04N 1/00427* (2013.01); *H04N 1/32106* (2013.01); *H04N 2201/0094* (2013.01); *H04N 2201/0096* (2013.01); *H04N 2201/3204* (2013.01)

(58) Field of Classification Search
None
See application file for complete search history.

(56) References Cited

U.S. PATENT DOCUMENTS

| 10,931,833 B2* | 2/2021 | Saeda | G06F 3/1286 |
| 2013/0021643 A1* | 1/2013 | Nuggehalli | H04N 1/00408 |
| | | | 358/1.15 |
| 2015/0373224 A1* | 12/2015 | Kusakabe | H04N 1/32096 |
| | | | 358/1.15 |

(Continued)

FOREIGN PATENT DOCUMENTS

| JP | 2013-025809 A | 2/2013 |
| JP | 2014093765 A * | 5/2014 |

OTHER PUBLICATIONS

Yamada, JP-2014-093765A English Translation merged with original JP Publication, Figs 5, 6, corresponding citations on p. 7 of NPL provided (Year: 2014).*

*Primary Examiner* — Miya J Cato
(74) *Attorney, Agent, or Firm* — ScienBiziP, P.C.

(57) ABSTRACT

A terminal device includes a display capable of displaying a reception screen that accepts settings of a job using destination information, a controller capable of outputting an instruction for executing the job to an image processing apparatus based on the settings of the job accepted through the reception screen, an obtainer capable of transmitting a request for obtaining the destination information to the image processing apparatus and obtaining the destination information from the image processing apparatus, and a storage capable of storing the destination information. The controller displays the destination information stored in the storage and the destination information obtained from the image processing apparatus on the display in a selectable manner.

5 Claims, 32 Drawing Sheets

(56) References Cited

U.S. PATENT DOCUMENTS

| | | | |
|---|---|---|---|
| 2016/0065764 A1* | 3/2016 | Kang | H04N 1/00307 358/1.13 |
| 2020/0274977 A1* | 8/2020 | Tani | G06F 3/1285 |
| 2021/0105368 A1* | 4/2021 | Sanou | H04N 1/00411 |
| 2022/0232131 A1* | 7/2022 | Shibayama | H04N 1/44 |
| 2022/0407980 A1* | 12/2022 | Arifuku | H04N 1/00408 |

* cited by examiner

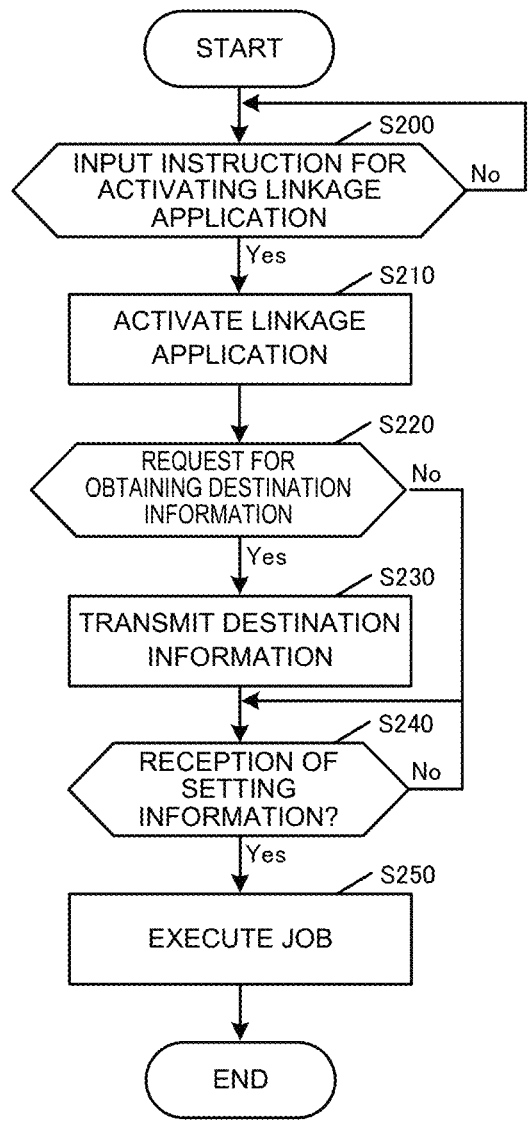

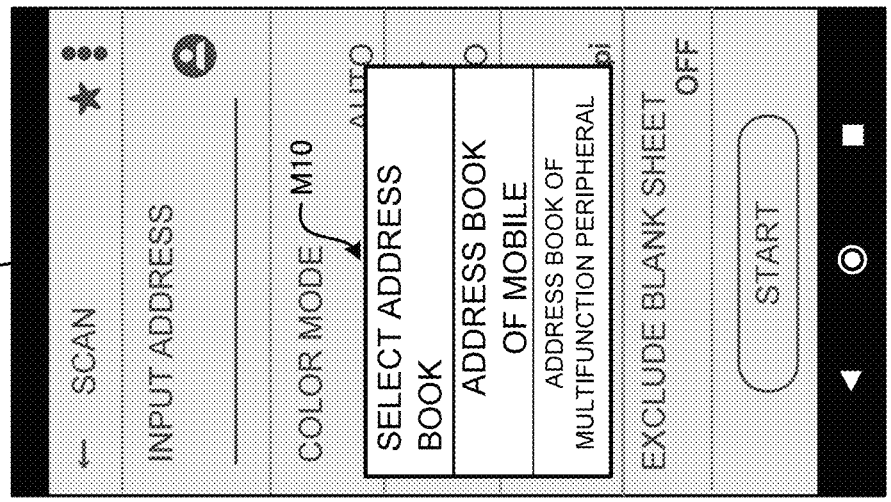
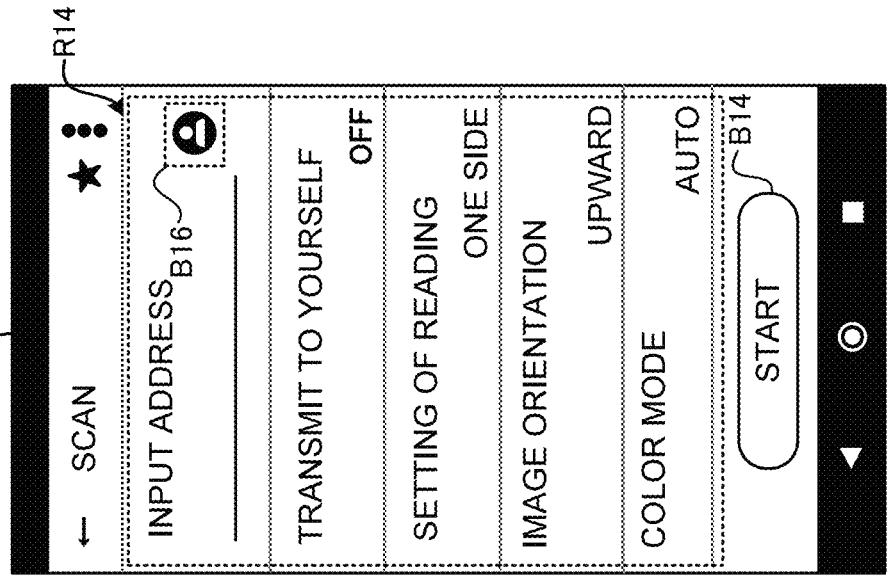
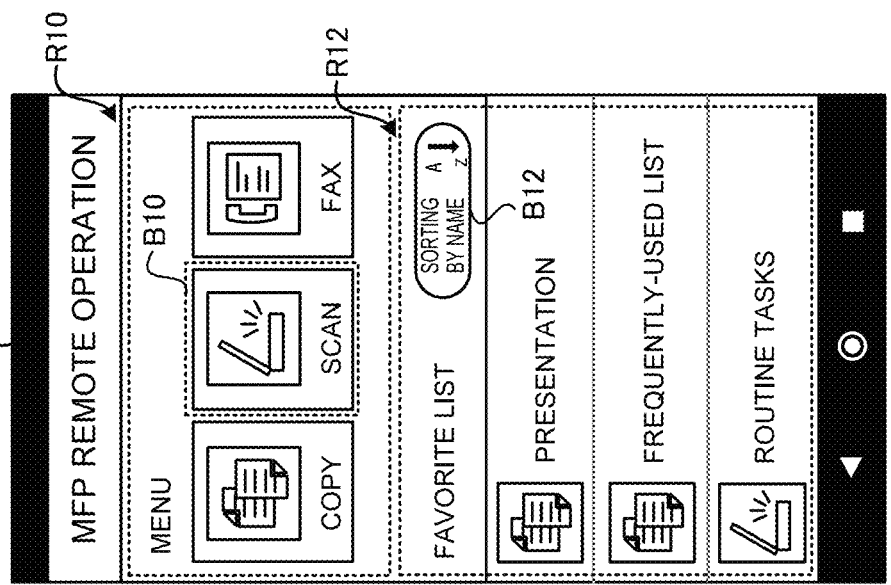

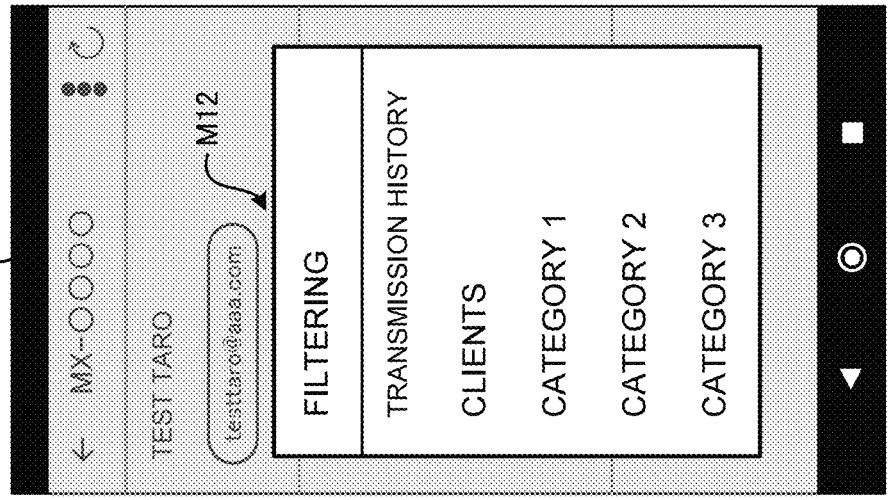
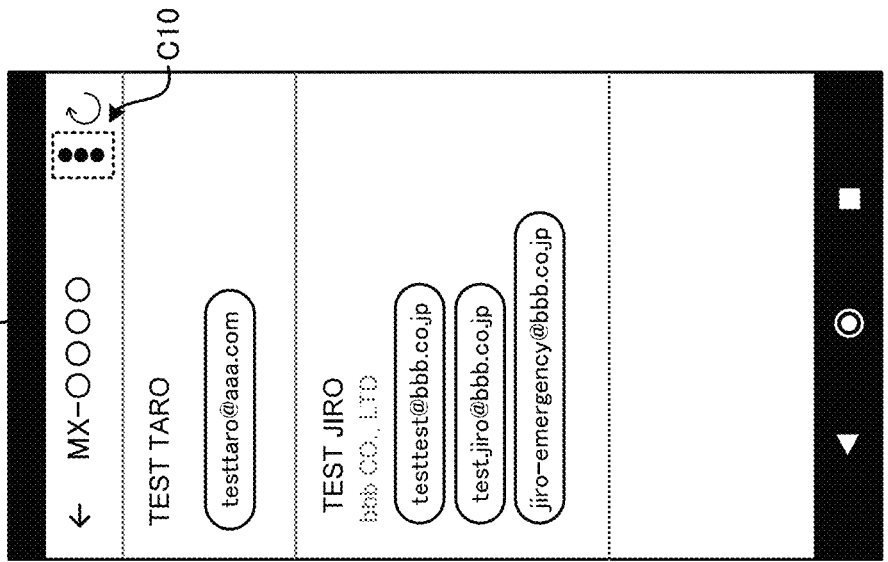
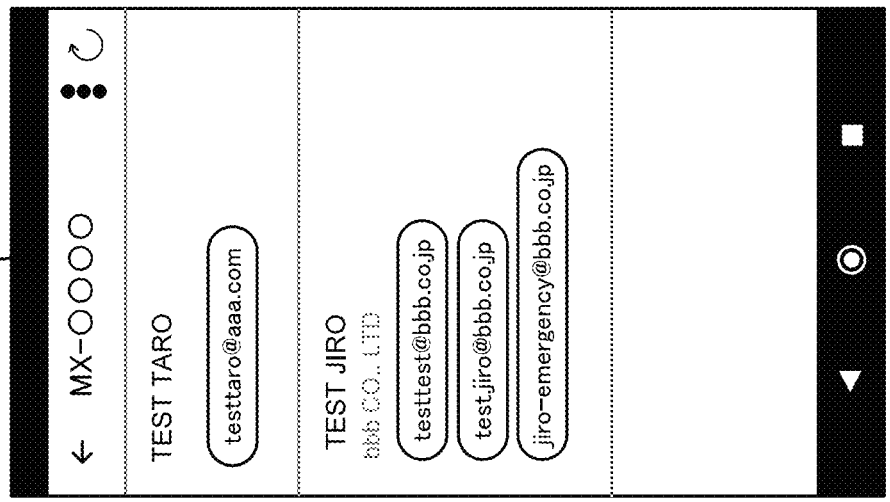

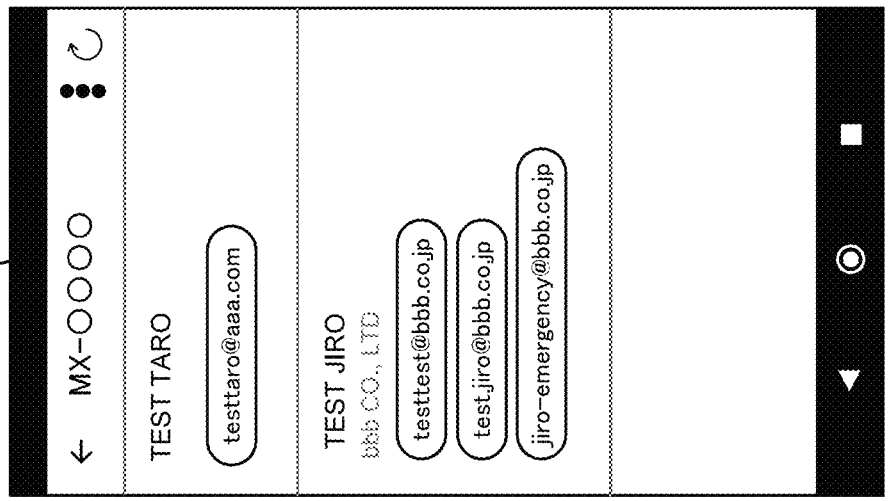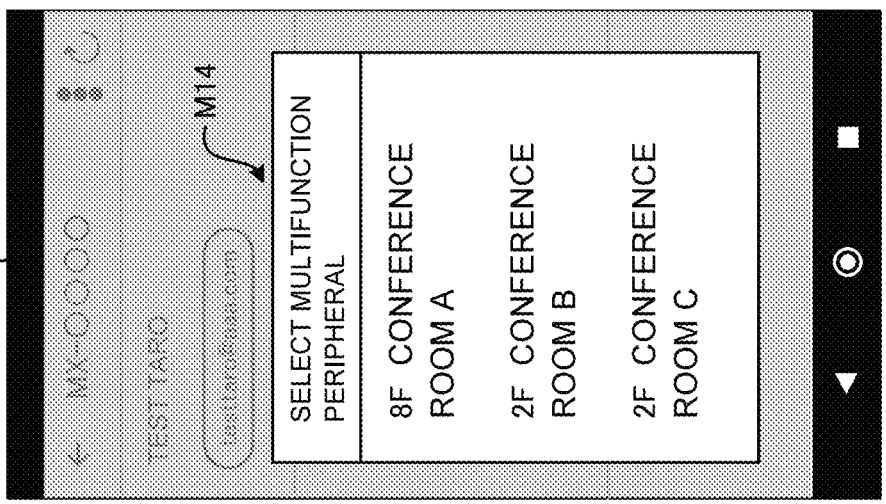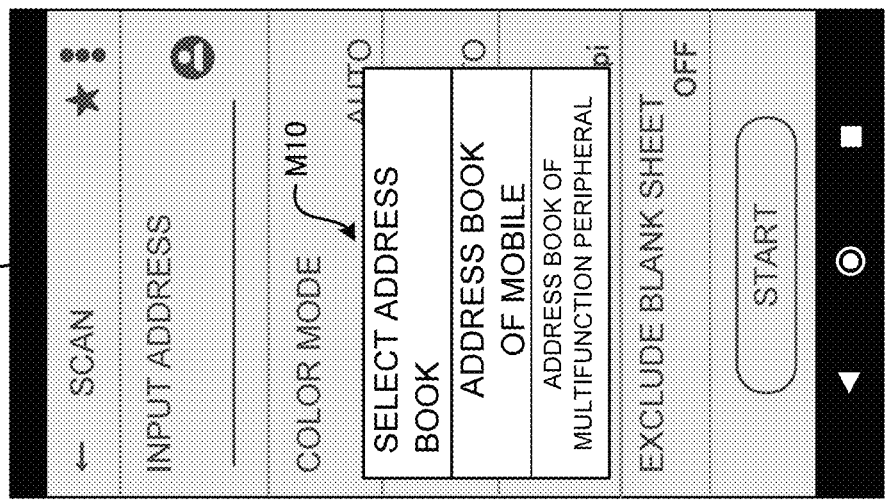

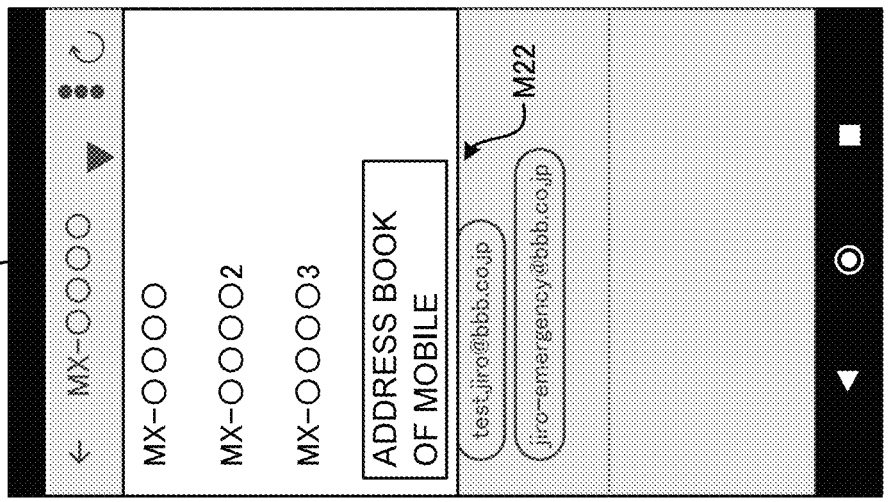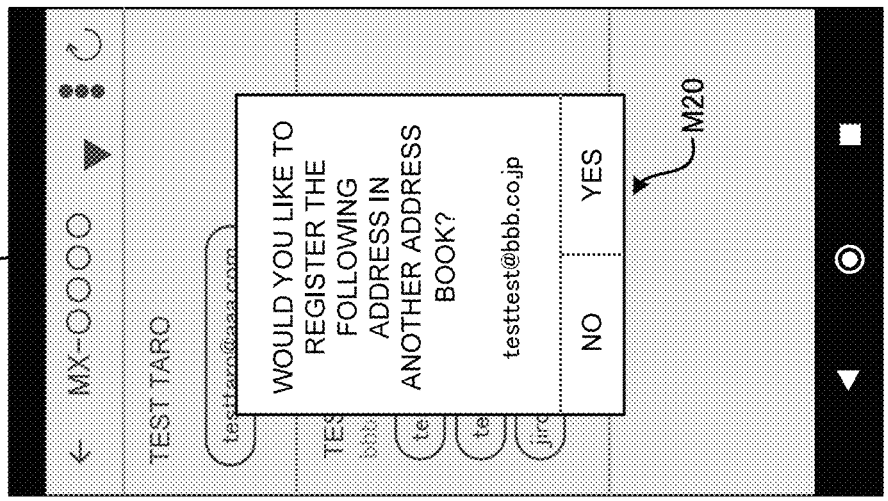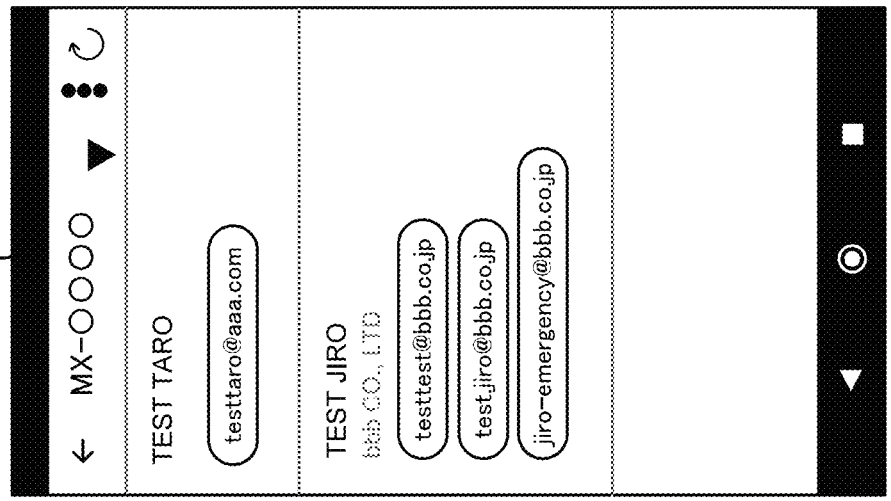

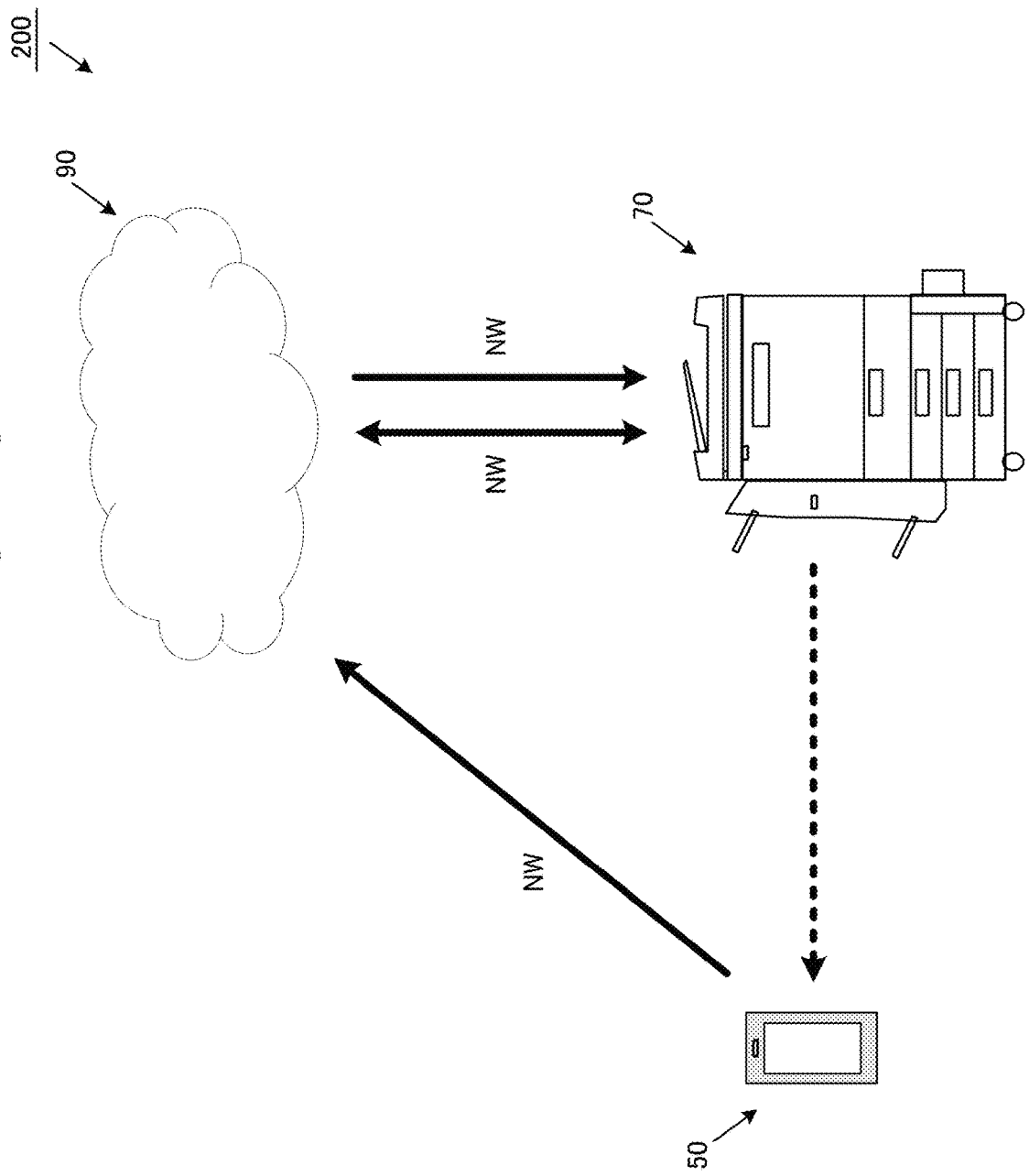

FIG. 15

| CONNECTION INFORMATION | SETTING INFORMATION |
|---|---|
| DEVICE ID "jv6Ou3QBGv8w6yNtGt" SESSION KEY "1qazxsw23edcvfr45tgbn hy67ujm, ki8 -----" | MODE: SCAN TRANSMISSION DESTINATION: testtest@bbb.co.jp SETTING OF READING: ONE SIDE IMAGE ORIENTATION: UPWARD COLOR MODE: AUTO |

FIG. 17

| | DEVICE INFORMATION ITEM (KEY) | VALUE |
|---|---|---|
| I/F RELATED ITEMS | NAME | "Remote Operationn" |
| | TYPE | "MFP" |
| | VERSION | "1.0" |
| MFP- RELATED ITEMS | COLOR MODE | "Color output possible" |
| | TRANSMISSION DESTINATION | "testtest@bbb.co.jp" |
| | SETTING OF READING | "One side" |
| | IMAGE ORIENTATION | "Upward" |
| | ⋮ | ⋮ |
| CONNECTION- RELATED ITEMS | DEVICE ID | "jv6Ou3QBGv8w6yNtGt" |
| | SESSION KEY | "1qazxsw23edcvfr45tgbnhy67ujm, ki8 ----" |
| | INSTALLATION COUNTRY | "0 –11" (example; value 3: JAPAN) |
| | ⋮ | ⋮ |

FIG. 19

| JOB ID | CONNECTION INFORMATION | SETTING INFORMATION |
|---|---|---|
| "#0001" | DEVICE ID "jv6Ou3QBGv8w6yNtGt" SESSION KEY "1qazxsw23edcvfr45tgb nhy67ujm, ki8 -----" | MODE: SCAN TRANSMISSION DESTINATION: testtest@bbb.co.jp SETTING OF READING: ONE SIDE IMAGE ORIENTATION: UPWARD COLOR MODE: AUTO |

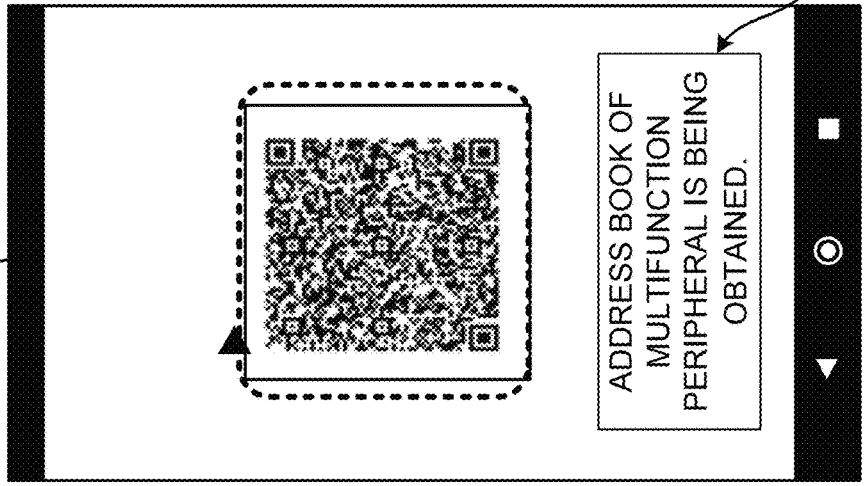
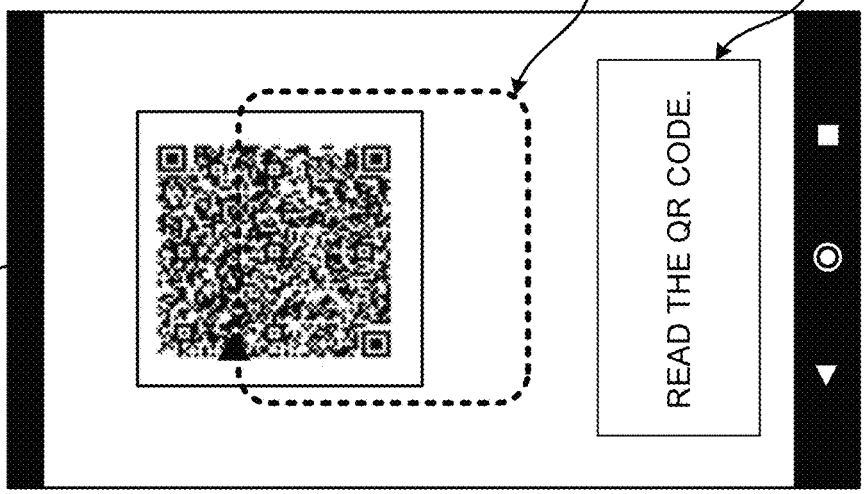
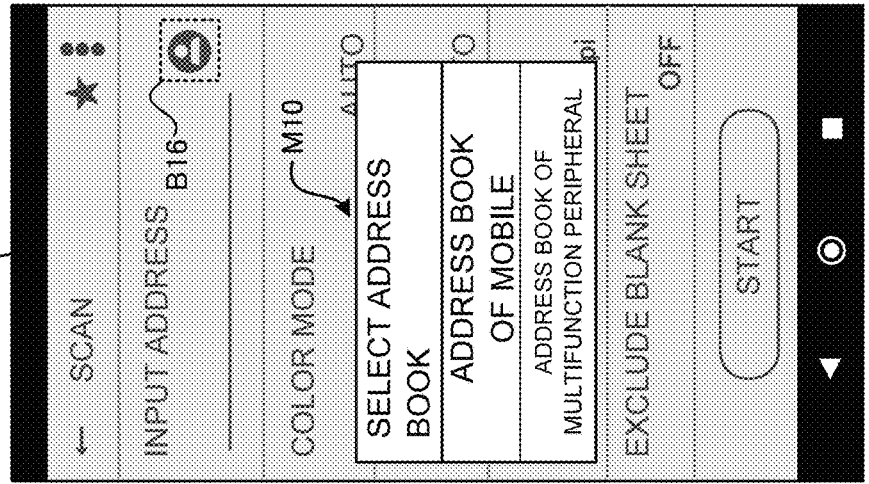

OUTPUT SYSTEM CAPABLE OF OUTPUTTING JOB USING ACQUIRED DESTINATION INFORMATION

BACKGROUND OF THE INVENTION

Field of the Invention

The present disclosure relates to a terminal device and the like.

Description of the Background Art

For example, multifunction peripherals capable of realizing, in a single apparatus, a plurality of modes, such as a copy mode, a scan mode, and a fax mode, often include an operation screen for selecting a mode and receiving inputs and selections of setting values for the selected mode.

Recently, it has been a primary trend to adopt, as an operation screen, a touch panel display including a display that displays various types of information to a user and a touch panel that is placed on the display in a superimposed manner to detect a position touched by a user's finger. The user operates the touch panel while checking the various types of information displayed on the display so as to achieve an intuitive and easy selection of a mode and intuitive and easy inputs and selections of the setting values for the selected mode.

Here, it is effective to avoid high frequency contact with unspecified persons to reduce a risk of various infectious diseases.

For example, operations via operation screens of shared multifunction peripherals in workplaces, multipurpose multifunction peripherals installed in convenience stores and the like, are no exception, and there is a need for urgent measures to avoid high-frequency contact.

As an example to avoid direct contact with an operation screen of a multifunction peripheral, etc., a method for generating a document job without manually inputting information to a document processing device, such as a multifunction peripheral terminal is known.

A technology is known by which a scan transmission job, for which a mobile device has performed job setting, is performed by an MFP (multifunction peripheral/printer). However, no technology is known by which display of destination information (hereinafter simply referred to as an "address book") stored in the mobile device or destination information stored in the MFP is displayed in a selectable manner when the MFP performs the scan transmission job based on the job setting performed in the mobile device. Therefore, the user is forced to perform a complicated operation when setting a destination of a scan transmission. In addition, even when destination information stored in the mobile device can be used as the destination for the scan transmission, the user is required to manually input destination information that is not stored in the mobile device in advance, and therefore, it is obvious that this requires more time and effort than when the destination information stored in the MFP can be used as the destination for scan transmission.

An object of the present disclosure is to provide a terminal device capable of setting a job using destination information, such as a scan mode and a fax mode, and causing an image processing apparatus to execute a job based on content of the setting. The terminal device can provide services that are highly usable for users by displaying destination information stored in the terminal device and destination information obtained from the image processing apparatus in a selectable manner.

SUMMARY OF THE INVENTION

According to an aspect of the present disclosure, a terminal device includes a display capable of displaying a reception screen that accepts settings of a job using destination information, a controller capable of outputting an instruction for executing the job to an image processing apparatus based on the settings of the job accepted through the reception screen, an obtainer capable of transmitting a request for obtaining the destination information to the image processing apparatus and obtaining the destination information from the image processing apparatus, and a storage capable of storing the destination information. The controller displays the destination information stored in the storage and the destination information obtained from the image processing apparatus on the display in a selectable manner.

According to another aspect of the present disclosure, an output system includes an image processing apparatus including a job controller that controls execution of a job using destination information and a first storage that stores the destination information; and a terminal device including a display capable of displaying a reception screen that accepts settings of the job, a controller capable of outputting the job to the image processing apparatus based on the settings of the job accepted through the reception screen, an obtainer capable of transmitting a request for obtaining the destination information to the image processing apparatus and obtaining the destination information from the image processing apparatus, and a second storage capable of storing the destination information, where the controller displays, on the display, the destination information stored in the second storage and the destination information obtained from the first storage in a selectable manner, and outputs the job using the destination information selected by a user to the image processing apparatus.

According to a further aspect of the present disclosure, an output method includes displaying a reception screen that accepts settings of a job using destination information on a display, performing control such that an instruction for executing the job is output to the image processing apparatus based on the settings of the job accepted through the reception screen, obtaining the destination information from the image processing apparatus after transmitting a request for obtaining the destination information to the image processing apparatus, and storing the destination information. The control includes displaying the destination information stored in the storing and the destination information obtained from the image processing apparatus on the display in a selectable manner.

According to the present disclosure, there is provided a terminal device capable of setting a job using destination information, such as a scan mode and a fax mode, and causing an image processing apparatus to execute a job based on content of the setting. The terminal device can provide services that are highly usable for users by displaying destination information stored in the terminal device and destination information obtained from the image processing apparatus in a selectable manner.

BRIEF DESCRIPTION OF THE DRAWINGS

FIG. 6 is a flowchart illustrating a process of the multifunction peripheral according to the first embodiment.

FIGS. 7A to 7C are diagrams illustrating an operation example according to the first embodiment.

FIGS. 9A to 9C are diagrams illustrating an operation example according to a second embodiment.

FIGS. 10A to 10C are diagrams illustrating an operation example according to the second embodiment.

FIGS. 12A to 12C are diagrams illustrating an operation example according to the second embodiment.

FIG. 13 is a diagram schematically illustrating an overall configuration of an output system according to a third embodiment.

FIG. 15 is a diagram illustrating a configuration example of a combination of setting information and connection information to be transmitted by the terminal device to a network service.

FIG. 17 is a diagram illustrating apparatus information according to the third embodiment.

FIG. 19 is a diagram illustrating an example of a data configuration of a job stored in a job storage region according to the third embodiment.

FIGS. 30A to 30C are diagrams illustrating an operation example according to the third embodiment.

DESCRIPTION OF THE PREFERRED EMBODIMENTS

Embodiments of the present disclosure will be described below with reference to the accompanying drawings. According to the present disclosure, a multifunction peripheral 30 capable of executing jobs associated with a copy mode, a scan mode, and a fax mode will be described as an example of an image processing apparatus. Embodiments below are examples for describing the present disclosure, and the technical scope of the description in the claims is not limited to the description below.

1 First Embodiment

Figure 1:
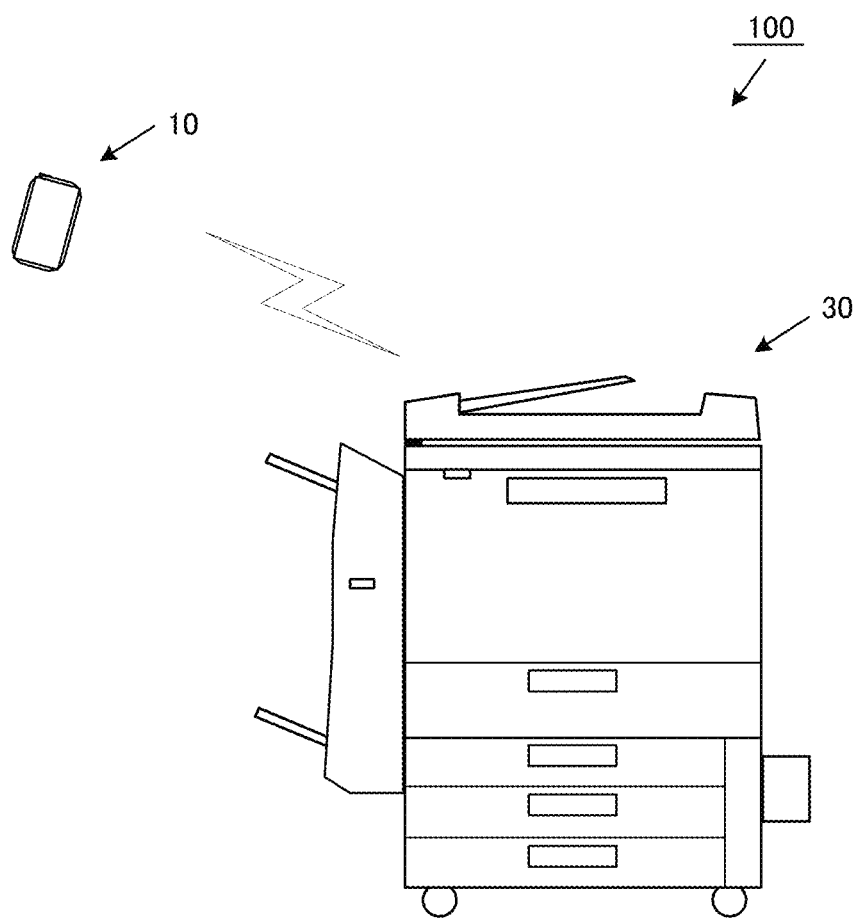
FIG. 1 is a diagram schematically illustrating an overall configuration of an output system according to a first embodiment.

FIG. 1 is a diagram schematically illustrating an overall configuration of an output system 100 according to a first embodiment. The output system 100 includes a terminal device 10 and a multifunction peripheral 30 serving as an image processing apparatus. Note that, in the output system 100 according to the first embodiment, an external authentication server, not illustrated, or the like may be separately installed to perform user authentication for the multifunction peripheral 30.

The terminal device 10 is connected to the multifunction peripheral 30 in a communication available manner through a short-range wireless communication protocol, such as Wi-Fi (registered trademark), Bluetooth (registered trademark), infrared light, NFC (Near Field Communication), or RFID (Radio Frequency Identification). The terminal device 10 is configured to obtain destination information described below from the multifunction peripheral 30.

Here, the destination information according to the present disclosure refers to information for specifying a destination of communication, such as a telephone number, an e-mail address, a fax number, account information, an address, a place of employment, and the like. The terminal device 10 or the multifunction peripheral 30 can accumulate destination information for each communication destination and manage the destination information as an address book.

1.1 Functional Configuration

1.1.1 Terminal Device 10

The terminal device 10 according to the present disclosure may be configured as a so-called mobile terminal device, such as a smartphone, a tablet, a cellular phone, or a laptop computer. The terminal device 10 is configured as a device that has a combination of at least a function of generating a (graphical) user interface, a communication function, and a function unique to mobile terminal devices.

Figure 2:
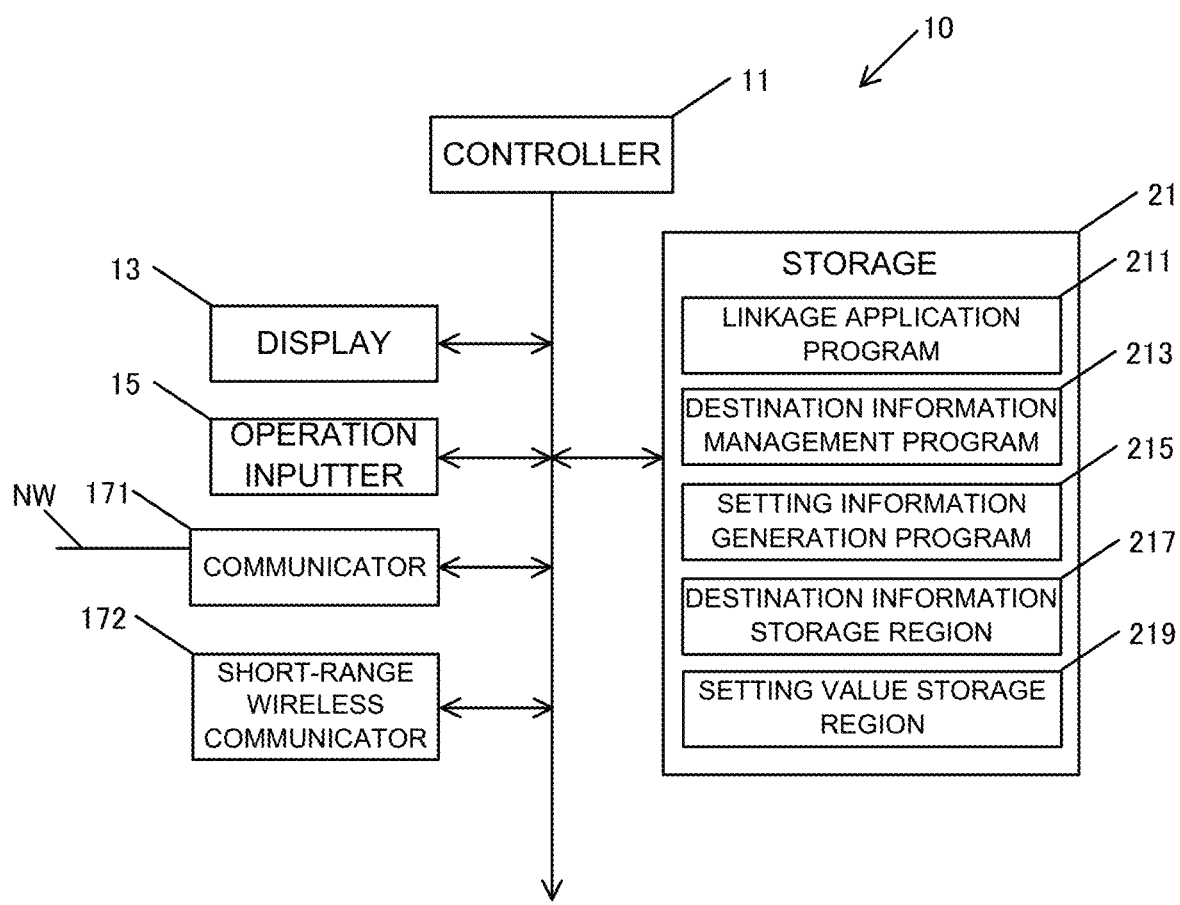
FIG. 2 is a diagram illustrating a functional configuration of a terminal device according to the first embodiment.

FIG. 2 is a diagram illustrating a functional configuration of the terminal device 10. The terminal device 10 includes a controller 11, a display 13, an operation inputter 15, a communicator 171, a short-range wireless communicator 172, and a storage 21.

The controller 11 comprehensively controls the terminal device 10. The controller 11, which is configured by at least one CPU (Central Processing Unit) or the like, for example, reads and executes various programs stored in the storage 21 to realize functions.

The display 13 displays various types of information to a user or the like. The display 13 may be constituted by, for example, an LCD (Liquid Crystal Display) or an organic EL (electro-luminescence) display. The display 13 may display, for example, an application screen as a reception screen for accepting job settings using destination information based on display control performed by the controller 11 which has read out a linkage application program 211 described below.

The operation inputter 15 accepts an input of information performed by the user or the like. The operation inputter 15 may be configured as a touch panel display that allows input via the display 13. In this case, examples of a method of input to the touch panel display may include a resistive method, an infrared method, an inductive method, and a capacitive method.

The communicator 171 includes either a wired or wireless interface or both wired and wireless interfaces to communicate with other devices via a LAN (local area network), a WAN (wide area network), the Internet, a telephone line, etc.

The short-range wireless communicator 172 may use Wi-Fi (registered trademark), Bluetooth (registered trademark), infrared light, NFC, RFID, and other short-range wireless communication protocols. A configuration of the short-range wireless communicator 172 is not particularly limited as long as destination information can be obtained by communication with another device, such as the multifunction peripheral 30.

The storage 21 stores various programs and various types of data required for operation of the terminal device 10. The storage 21 may be constituted by a storage device, such as a RAN (random access memory), an HDD (hard disk drive), an SSD (solid state drive), or a ROM (read only memory).

According to the first embodiment, the storage 21 stores a linkage application program 211, a destination information management program 213, and a setting information generation program 215, and ensures a destination information storage region 217 and a setting value storage region 219.

The linkage application program 211 is read by the controller 11 to start linkage with the multifunction peripheral 30. The controller 11 reads the linkage application program 211 to generate an application screen for accepting job settings to be executed by the multifunction peripheral 30 and to output job execution instructions or the like to the multifunction peripheral 30.

The controller 11 may also make a request to obtain destination information managed by the multifunction peripheral 30 when linking with the multifunction peripheral 30. The controller 11, that has read the linkage application program 211, controls the short-range wireless communicator 172 or the like to communicate with the multifunction peripheral 30 and obtains the destination information managed by the multifunction peripheral 30. For example, when using Bluetooth (registered trademark) as a short-range wireless communication method, the controller 11 can follow a PBAP (phone book access profile) to collectively obtain the destination information managed by the multifunction peripheral 30 in a vCard format.

Here, the term "linkage" denotes that at least two devices work together while sharing information in order to achieve a single result. In the first embodiment, setting information pertaining to execution of a job set in the terminal device 10 is output to the multifunction peripheral 30. By obtaining the setting information, the multifunction peripheral 30 can share the setting information pertaining to job execution with the terminal device 10. Then, the multifunction peripheral 30 executes a job based on the setting information using an execution instruction output from the terminal device 10 as a trigger.

The linkage between the terminal device 10 and the multifunction peripheral 30 requires a connection between the terminal device 10 and the multifunction peripheral 30 and bidirectional communication between the terminal device 10 and the multifunction peripheral 30. The connection established between the terminal device 10 and the multifunction peripheral 30 may be limited to a connection only during operation of the linked application, or may be maintained at all times while the devices are in operation. Furthermore, the connection may be established only when communication is required. In the first embodiment, a case where activation of the linkage application triggers start of the connection and termination of the linkage application triggers termination of the connection to dissolve the linkage.

The destination information management program 213 is read by the controller 11 when the controller 11 manages destination information including a telephone number, an e-mail address, a fax number, and an account of a destination that are to be used in applications, such as a phone call, an e-mail, fax, and SNS. The controller 11 which has read the destination information management program 213 performs processing, such as new registration, editing, and deletion of the destination information, in accordance with an instruction issued by the user.

The setting information generation program 215 is read by the controller 31 to generate setting information based on the setting values input and selected via the reception screen displayed on the display 13. After reading the setting information generation program 215, the controller 11 generates setting information to be used to execution of a job using the various setting values that have been input and selected via the reception screen and stored in the setting value storage region 219. The controller 11 then outputs the generated setting information to the multifunction peripheral 30 so as to cause the multifunction peripheral 30 to execute the job.

The destination information storage region 217 stores, for example, telephone numbers, e-mail addresses, fax numbers, accounts, and the like as destination information managed by the terminal device 10. Furthermore, the controller 11 can manage the destination information obtained from the multifunction peripheral 30 together with the destination information managed by itself.

The setting value storage region 219 stores setting values pertaining to execution of a job. The setting values stored in the setting value storage region 219 may be read out as needed when the controller 11 generates setting information.

1.1.2 Multifunction Peripheral 30

Figure 3:
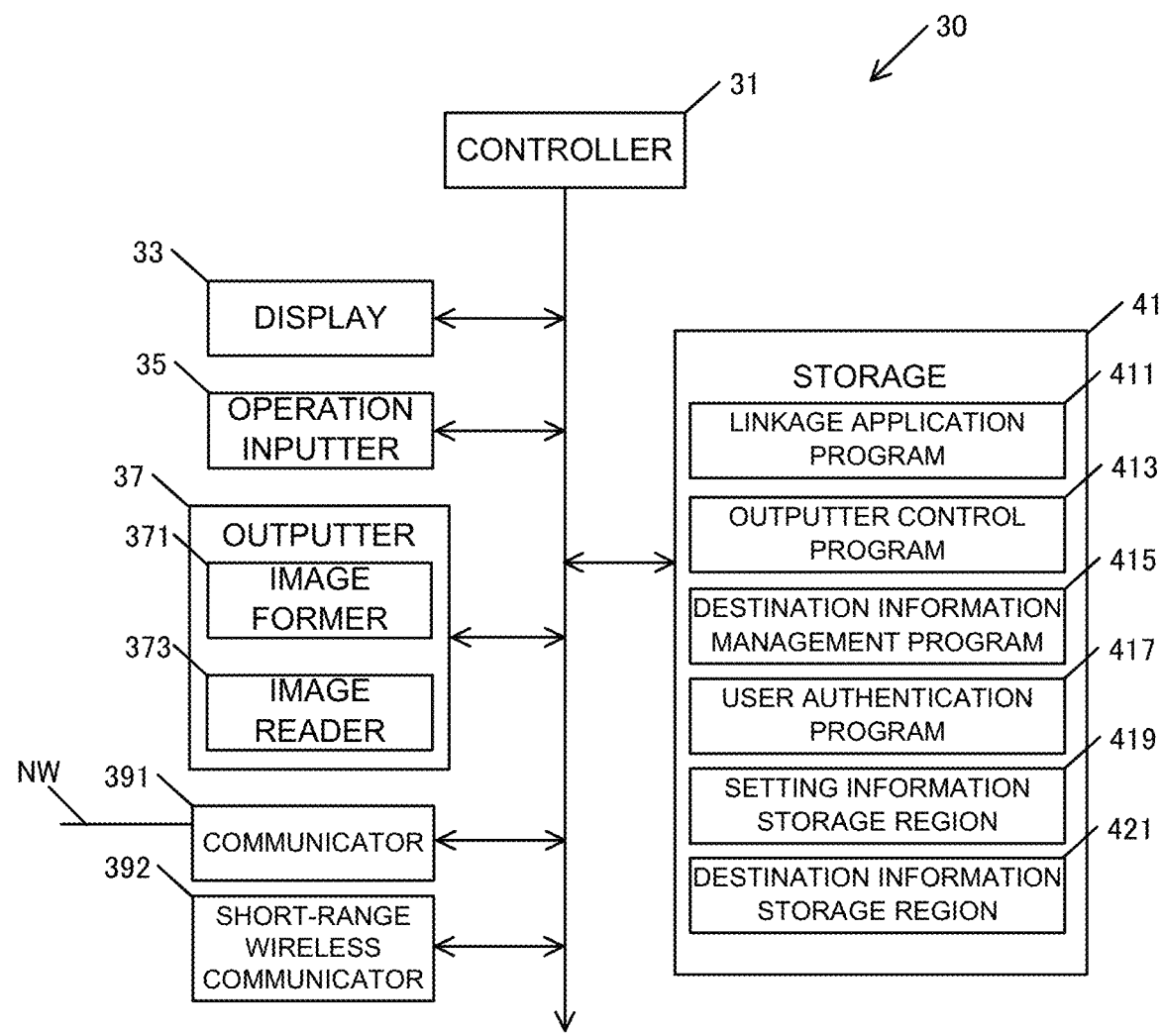
FIG. 3 is a diagram illustrating a functional configuration of a multifunction peripheral according to the first embodiment.

FIG. 3 is a diagram illustrating a functional configuration of the multifunction peripheral 30. The multifunction peripheral 30 includes a controller 31, a display 33, an operation inputter 35, an outputter 37, a communicator 391, a short-range wireless communicator 392, and a storage 41.

The controller 31 controls the entire multifunction peripheral 30. The controller 31 is constituted by, for example, one or more arithmetic devices (such as CPUs). The controller 31 reads and executes various programs stored in the storage 41 to implement functions thereof.

The display 33 displays various types of information to the user, for example. The display 33 may be constituted by, for example, an LCD or an organic EL display.

The operation inputter 35 receives input of information performed by the user or the like. The operation inputter 35 may be constituted by a hard key (e.g., a numeric keypad), buttons, and the like. Note that the operation inputter 35 may be constituted by a touch panel display that allows input via the display 33. In this case, examples of a method of input to the touch panel display may include a resistive method, an infrared method, an inductive method, and a capacitive method.

The outputter 37 includes an image former 371 and an image reader 373. The image former 371 forms an image based on image data (image data generated by scanning on a printed document or image data input from an external device) on paper, which is a recording medium, to be output. The image former 371 can be composed of, for example, a laser printer employing an electrophotographic method. The image former 371 forms images by using toners supplied from toner cartridges, not illustrated, corresponding to toner colors (e.g., cyan, magenta, yellow, and black).

The image reader 373 scans and reads the printed document (document image), which is a reading target, to generate and output image data. The image reader 373 may be configured as a scanner device including an image sensor, such as a CCD (charge coupled device) or a CIS (contact image sensor). The configuration of the image reader 373 is not limited as long as the image reader 373 is configured to read a reflected light image from the printed document with an image sensor and thus output image data.

The communicator 391 includes either a wired or wireless interface or both wired and wireless interfaces to communicate with other devices via a LAN, a WAN, the Internet, a telephone line, a fax line, etc.

The short-range wireless communicator 392 may use Wi-Fi (registered trademark), Bluetooth (registered trademark), infrared light, NFC, RFID, and other short-range wireless communication protocols. A configuration of the short-range wireless communicator 392 is not particularly limited as long as communication with other devices, such as the terminal device 10, is available.

The storage 41 stores therein various programs and various types of data required for operation of the multifunction peripheral 30. The storage 41 may include a storage device such as a RAM, an HDD, an SSD, or a ROM.

According to the first embodiment, the storage 41 stores a linkage application program 411, an outputter control program 413, a destination information management program 415, and a user authentication program 417 and ensures a setting information storage region 419 and a destination information storage region 421.

The linkage application program 411 is read by the controller 31 when the controller 31 starts linkage with the terminal device 10 or the like. The controller 31 reads the linkage application program 411 to obtain setting information pertaining to execution of a job set in the terminal device 10, and in addition, execute a job based on the setting information obtained based on a job execution instruction input from the terminal device 10.

The outputter control program 413 is read by the controller 31 when the controller 31 controls the outputter 37, such as the image former 371 and the image reader 373. When the controller 31 that has read the outputter control program 413 controls the outputter 37 so that the image former 371 performs print output or the image reader 373 performs output of image data.

The destination information management program 415 is read by the controller 31 when the controller 31 manages destination information. The controller 31, which has read the destination information management program 415, manages the destination information so that the destination information set as a destination of image data, such as scanned data, fax data, and other image data in a scan mode, a fax mode, and the like is available for reference. Furthermore, the controller 31 outputs the managed destination information to the terminal device 10 in response to a request for obtaining the destination information supplied from the terminal device 10.

The user authentication program 417 is read by the controller 31 to authenticate a user who logs into the multifunction peripheral 30. After reading the user authentication program 417, when the authentication function is on, the controller 31 performs user authentication based on the authentication information received via a login screen, not illustrated, or the like. Note that the user authentication may also be performed through biometric authentication, such as, fingerprint authentication or face recognition, as well as property authentication using an ID (Identity/Identification Card) card, such as an IC (Integrated Circuit) card or a magnetic card distributed to the user.

When authentication of the terminal device 10 or a user using the terminal device 10 is required for linkage with the terminal device 10, authentication information of the terminal device 10 may be obtained via the short-range wireless communicator 392. The controller 31, which has read the user authentication program 417, performs user authentication based on the input authentication information accepted.

The setting information storage region 419 stores setting information pertaining to execution of a job. The setting information storage region 419 may store, in addition to the setting information for executing a job by the multifunction peripheral 30 alone, setting information obtained from the linked terminal device 10.

The destination information storage region 421 stores destination information managed by the controller 31. The destination information stored in the destination information storage region 421 can be read where appropriate when a destination of transmission of image data, such as scanned data or fax data, is set or output to the terminal device 10, or when the destination information is managed.

1.2 Processing Flow 1.2.1 Overall Processing

Figure 4:
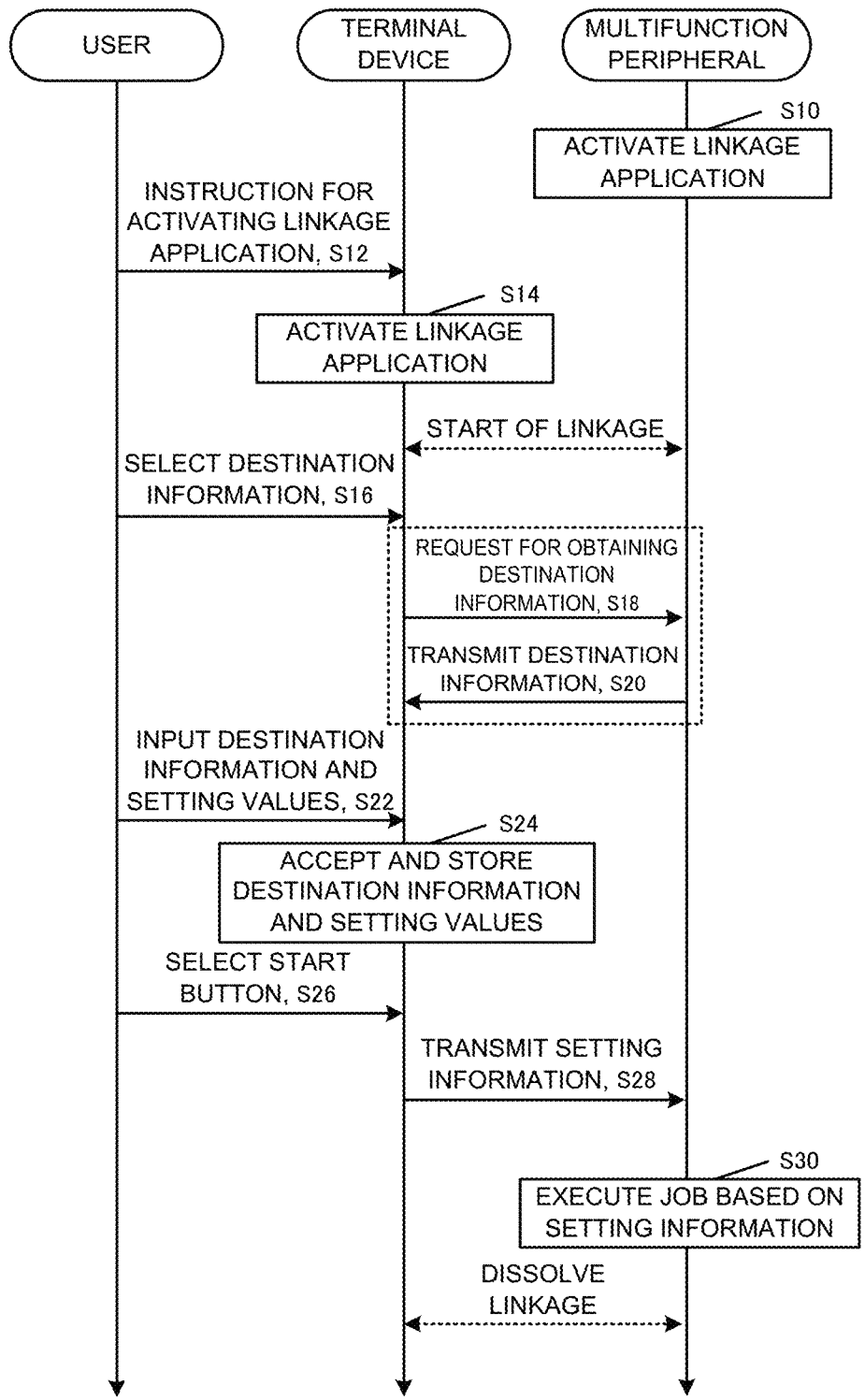
FIG. 4 is a flowchart illustrating an overall process according to the first embodiment.

Next, overall processing according to the first embodiment will be described with reference to a flowchart in FIG. 4. Note that, in FIG. 4, a form of execution of a job (hereinafter referred to as a "transmission job" where appropriate) using destination information in a scan mode, a fax mode, or the like will be described.

First, the multifunction peripheral 30 activates a linkage application based on an activation instruction issued by the user (step S10). The linkage application of the multifunction peripheral 30 may be activated not only by an activation instruction input by the user but also in an automatic manner when the device is activated, when restoration from a sleep mode is performed, when auto clear is performed, or when user authentication is successfully performed in an enabled authentication mode.

The user inputs an instruction for activating the linkage application by operating the terminal device 10 (step S12).

Upon receiving the activation instruction issued by the user, the controller 11 of the terminal device 10 activates the linkage application by reading the linkage application program 211 (step S14). When the linkage application is activated, the short-range wireless communicator 172 of the terminal device 10 and the short-range wireless communicator 392 of the multifunction peripheral 30 establish a connection to start linkage.

The user selects destination information as a destination for transmitting scan data or fax data via the application screen provided by the linkage application of the terminal device 10 (step S16).

Here, the controller 11 transmits a request for obtaining destination information to the multifunction peripheral 30 to display the destination information managed by the multifunction peripheral 30 in a selectable manner in addition to the destination information managed by the controller 11 (step S18).

The controller 31 of the multifunction peripheral 30 transmits the destination information managed by the controller 31 to the terminal device 10 via the short-range wireless communicator 392 in response to the request for obtaining destination information supplied by the terminal device 10 (step S20).

The user selects destination information as a transmission destination from among the destination information managed by the controller 11 of the terminal device 10 and the destination information obtained from the multifunction peripheral 30, and inputs various setting values required for execution of a job (step S22).

The controller 11 of the terminal device 10 receives the selected destination information and the input setting values and stores the destination information and the setting values in the destination information storage region 217 and the setting value storage region 219, respectively (step S24).

Next, when the user selects a start button as a job execution instruction input, the controller 11 transmits the destination information and the setting values to the multifunction peripheral 30 as setting information (step S26→step S28).

The multifunction peripheral 30 executes the job based on the setting information obtained from the terminal device 10 (step S30). Note that, when it is determined that there are no jobs to be executed in a linkage manner, the controller 31 of the multifunction peripheral 30 and the controller 11 of the terminal device 10 dissolve the linkage and terminate the process.

1.2.2 Processing of Terminal Device 10

Figure 5:
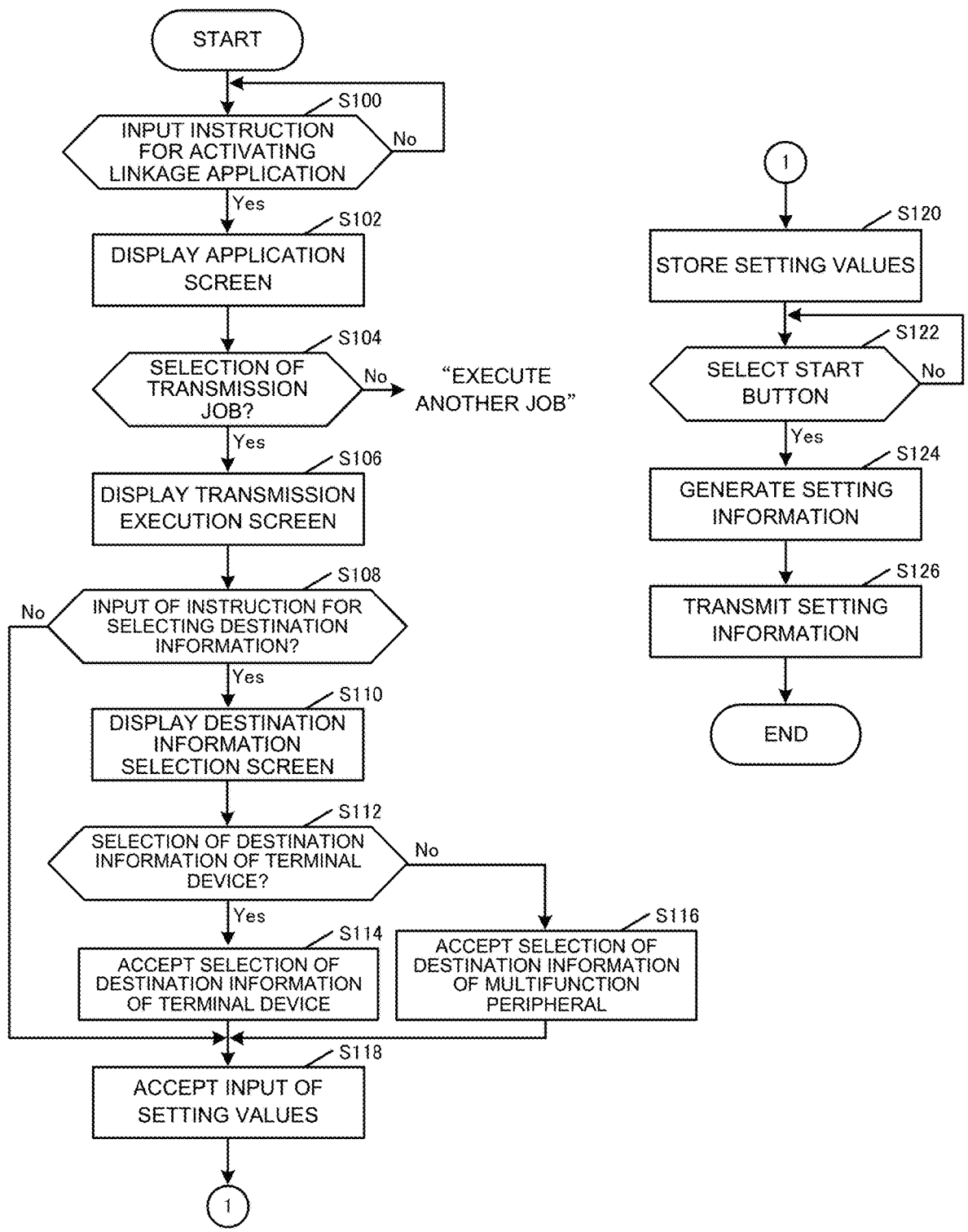
FIG. 5 is a flowchart illustrating a process of the terminal device according to the first embodiment.

Next, processing of the terminal device 10 according to the first embodiment will be described with reference to a flowchart in FIG. 5.

The controller 11 determines whether an instruction for activating the linkage application has been input by the user (step S100).

When it is determined that an input of the instruction for activating the linkage application has been received, the controller 11 reads the linkage application program 211 so as to activate the linkage application. When the linkage application is activated, the controller 11 generates an application screen for accepting settings of a job to be executed by the multifunction peripheral 30 and displays the application screen via the display 13 (step S100; Yes→step S102). On the other hand, when it is determined that input of the instruction for activating the linkage application has not been received, the controller 11 waits until the activation instruction is input (step S100; No).

Subsequently, the controller 11 determines whether a job selected via the application screen is a transmission job (step S104).

When it is determined that the selected job is a transmission job, the controller 11 displays a transmission execution screen (step S104; Yes→step S106). On the other hand, when it is determined that the selected job is not a transmission job, the controller 11 displays an execution screen for another job (e.g., a copy job) and executes the other job (step S104; No→"execute another job").

Then, the controller 11 determines whether an instruction for selecting destination information has been input through the displayed transmission execution screen (step S108). When it is determined that the instruction for selecting destination information has been input, the controller 11 displays a destination information selection screen (step S108; Yes→step S110).

Note that, before the destination information selection screen is displayed, the controller 11 transmits a request for obtaining destination information to the multifunction peripheral 30 to display the destination information managed by the multifunction peripheral 30 in a selectable manner in addition to the destination information managed by the controller 11. When obtaining the destination information from the multifunction peripheral 30, the controller 11 displays the destination information obtained from the multifunction peripheral 30 in a selectable manner in addition to the destination information managed by the controller 11.

On the other hand, when it is determined that no instruction for selecting destination information has been input, the controller 11 proceeds to step S118 (step S108; No→step S118). Here, when no destination information selection instructions have been input, settings based on a preceding transmission job that has been executed can be reproduced on the transmission execution screen, and therefore, destination information associated with the preceding transmission job is not required to be input again.

Then, the controller 11 determines whether the user has selected destination information managed by the terminal device 10 (step S112).

When it is determined that destination information of the terminal device 10 has been selected, the controller 11 receives the selected destination information of the terminal device 10 (step S112; Yes→step S114).

On the other hand, when it is determined that destination information of the multifunction peripheral 30 has been selected, the controller 11 receives the selected destination information of the multifunction peripheral 30 (step S112; No→step S116).

Subsequently, the controller 11 accepts inputs of the setting values for executing the transmission job and stores the setting values in the setting value storage region 219 (step S118→step S120).

Then, the controller 11 determines whether the start button has been selected by the user as a job execution instruction (step S122). When it is determined that the start button has been selected by the user, the controller 11 generates setting information using the selected destination information and the setting values stored in the setting value storage region 219 (step S122; Yes→step S124). On the other hand, when it is determined that the start button has not been selected, the controller 11 waits until the start button is selected (step S122; No).

The controller 11 transmits the generated setting information to the multifunction peripheral 30, and terminates the process (step S126).

1.2.3 Processing of Multifunction Peripheral

Next, processing of the multifunction peripheral 30 according to the first embodiment will be described with reference to a flowchart in FIG. 6.

The controller 31 determines whether an instruction for activating the linkage application has been input (step S200).

When it is determined that the input of the instruction for activating the linkage application has been received, the controller 31 reads the linkage application program 411 so as to activate the linkage application (step S200; Yes→step S210). On the other hand, when it is determined that an input of the instruction for activating the linkage application has not been received, the controller 31 waits until the activation instruction is input (step S200; No). Note that, when the user authentication is required to use the linked application, the controller 31 reads the user authentication program 417 and performs the user authentication.

After activating the linkage application, the controller 31 determines whether a request for obtaining destination information has been received from the terminal device 10 (step S220). When it is determined that the request for obtaining destination information has been received, the controller 31 transmits the destination information managed by itself to the terminal device 10 (step S220; Yes→step S230). On the other hand, when it is determined that no request for obtaining destination information has been received, the controller 31 proceeds to step S240 (step S220; No→step S240).

Then, the controller 31 determines whether setting information has been received from the terminal device 10 (step S240). When it is determined that setting information has been received, the controller 31 executes a job based on the setting information by controlling the outputter 37 and so on based on the received setting information, and terminates the process (step S240; Yes→step S250). Meanwhile, when it is determined that no setting information has been received, the controller 31 waits until the setting information is received (step S240; No).

1.3 Operation Example

Next, an operation example according to the first embodiment will be described. FIGS. 7A to 7C are diagrams illustrating an example of a series of operations pertaining to a selection of an address book as destination information performed by a user. Note that this operation example corresponds to the process from step S102 to step S116 in FIG. 5.

FIG. 7A is a diagram illustrating a form of an application screen W10 displayed by the controller 11 on the display 13 in response to an instruction for activating the linkage application of the terminal device 10 issued by the user. The application screen W10 includes a menu display region R10 and a favorite list display region R12.

The menu display region R10 includes a copy job selection button, a scan job selection button B10, and a fax job selection button. The menu display region R10 can display the selection buttons related to job modes that can be executed in the multifunction peripheral 30. The user may cause the multifunction peripheral 30 to execute a desired job by selecting one of the selection buttons associated with one of the job modes displayed in the menu display region R10.

The favorite list display region R12 displays items frequently used by the user in a list format. The display of the ascending and descending order of the items displayed in the favorite list display region R12 may be switched by a sort button B12.

FIG. 7B is a diagram illustrating an example of a configuration of a scan job execution screen W20 displayed by the controller 11 in response to a selection of the scan job selection button B10 included in the menu display region R10. A scan job execution screen W20 includes a setting value setting region R14 and a start button B14.

The setting value setting region R14 accepts an input and a selection of destination information and setting values for scan job execution. The setting value setting region R14 includes setting items associated with the scan job execution, such as items "input address" for accepting an input and a selection of an address serving as destination information, "transmit to yourself", "setting of reading", "image orientation", and "color mode". The user can input and select destination information and setting values for a scan job via the setting value setting region R14.

The start button B14 accepts an instruction input for executing a scan job. After completing the input of destination information and setting values in the setting value setting region R14, the user can select the start button B14 to output an instruction for executing a scan job to the multifunction peripheral 30.

Here, the item "input address" in the setting value setting region R14 includes an address book selection button B16, which accepts an instruction for selecting destination information in addition to a direct input of a transmission destination. The address book selection button B16 accepts an instruction for displaying a modal M10 that accepts an instruction for selecting an address of a transmission destination from an address book of the terminal device 10 (mobile) or an address book of the multifunction peripheral 30.

FIG. 7C is a diagram illustrating an example of a configuration of the modal M10 as a destination information selection screen displayed by the controller 11 in response to the selection of the address book selection button B16. The modal M10 displays addresses as transmission destinations in a selectable manner. In FIG. 7C, an example of a configuration of the modal M10 displayed such that an address book managed by the terminal device 10 (an address book of a mobile) or an address book managed by the multifunction peripheral 30 (an address book of the multifunction peripheral) is selectable is illustrated. The user can select one of the address book of a mobile or the address book of a multifunction peripheral displayed on the modal M10 and select a desired address from the selected address book.

Figure 8B:
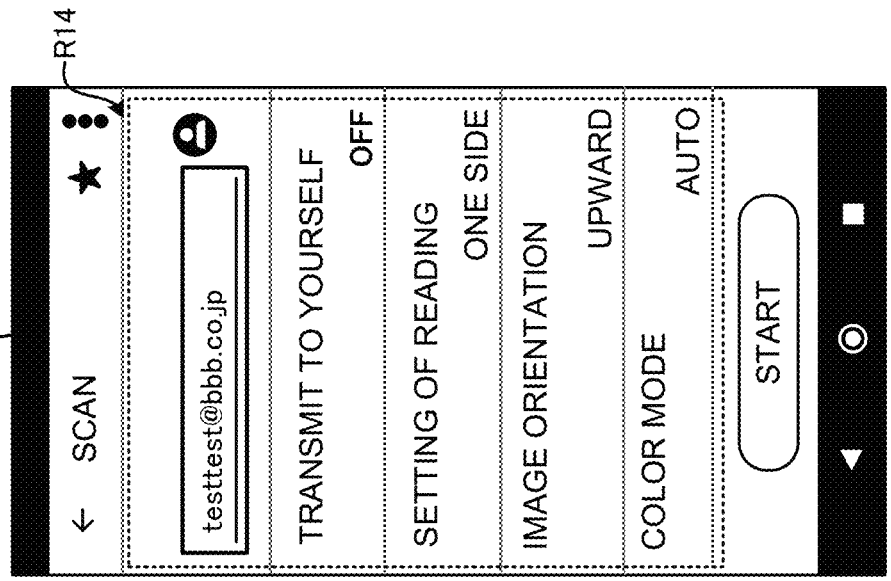
FIGS. 8A and 8B are diagrams illustrating an operation example according to the first embodiment.
Figure 8A:
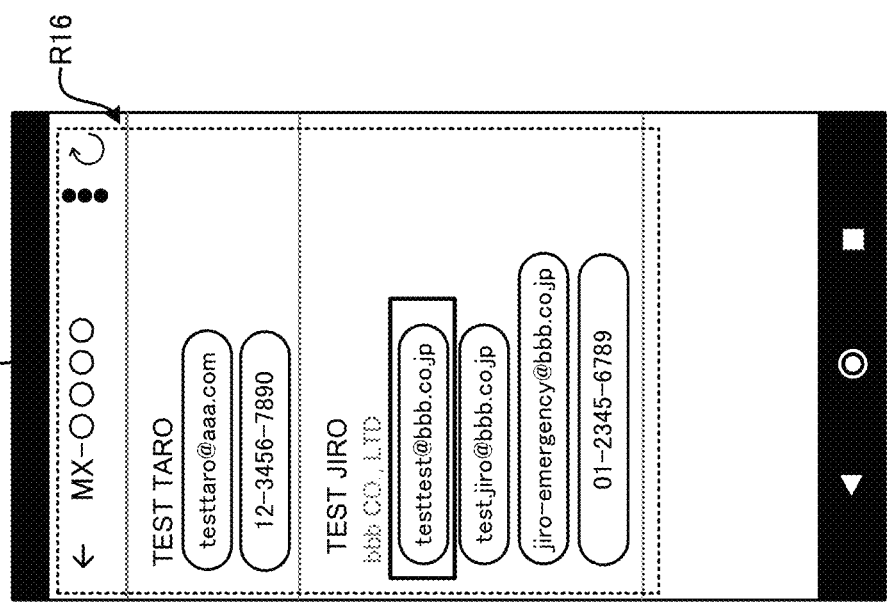

FIG. 8A is a diagram illustrating an example of a configuration of an address book display screen W30 displayed by the controller 11 when the address book of the multifunction peripheral 30 (a product name: MX-0000) is selected in the modal M10 illustrated in FIG. 7C. The address book display screen W30 includes an address book display region R16. In the address book display region R16, an address book including e-mail addresses (e.g. testtaro@aaa.com) and fax numbers (e.g., 12-3456-7890) is displayed as destination information for individual users registered in the multifunction peripheral 30.

FIG. 8B is a diagram illustrating a state in which, as a result of a selection of the e-mail address "testtest@bbb.co.jp" (in a rectangular frame in the figure) of a user "Test Jiro" displayed in the address book display region R16 illustrated in FIG. 8A, the e-mail address is set in the item "input address" in the setting value setting region R14.

As described above, according to the first embodiment, the address book serving as the destination information managed by the multifunction peripheral 30 may be obtained in addition to the address book managed by the terminal device 10 via the scan job execution screen W20 of the terminal device 10 and an e-mail address or the like of a user recorded in the address book may be set.

2. Second Embodiment

A second embodiment is associated with use of destination information obtained from the image processing apparatus. Note that, since a functional configuration, a processing flow, and the like according to the second embodiment are substantially the same as those of the first embodiment, descriptions thereof are omitted.

2.1 Process of Filtering Destination Information

In the first embodiment, the form in which addresses such as e-mail addresses or fax numbers of individual users managed by the multifunction peripheral 30 are obtained and displayed is described with reference to FIG. 8A. In the section "2.1", a form in which addresses obtained in accordance with a job mode (a scan job or a fax job) selected in the menu display region R10 of the application screen W10 are filtered will be described.

FIG. 9A is a diagram illustrating an example of a result of a filtering process performed so that only an e-mail address is displayed when a scan job is selected as a job mode. The controller 11 of the terminal device 10 can display only an e-mail address by removing a fax number by performing the filtering process on the address book obtained from the multifunction peripheral 30 in accordance with a selected job mode (the scan job).

In this way, only an address pertaining to the selected job mode is displayed on the address book display screen W30, and therefore, the user can select an appropriate address in accordance with the selected job mode.

2.2 Process of Filtering Destination Information

In the section 2.2, a form in which filtering search using a specific parameter, such as transmission history, is enabled for an address displayed in the address book display screen W30 is described.

FIG. 9B is the same figure as FIG. 9A and is a diagram for describing a three-point reader menu C10 for performing filtering search. The user selects the three-point reader menu C10 when performing the filtering search.

FIG. 9C is a diagram illustrating an example of a configuration of a modal M12 displayed by the controller 11 in response to a selection of the three-point reader menu C10 of FIG. 9B. The modal M12 displays parameters for the filtering search, such as "transmission history", "clients", "category 1", "category 2", and "category 3". The user can select a desired one of the search parameters to perform the filtering search in accordance with the selected parameter.

2.3 Process of Selecting One of Registered Multifunction Peripherals

In the section 2.3, one multifunction peripheral 30 is selected from among a plurality of multifunction peripherals 30 registered in advance, and addresses managed by the multifunction peripheral 30 are displayed.

FIG. 10A is the same as FIG. 7C, and is an example of the modal M10 that accepts a selection of an address book (an address book of a multifunction peripheral) managed by the multifunction peripheral 30. When an address book of a multifunction peripheral is selected in the modal M10 illustrated in FIG. 10A, the controller 11 displays a modal M14 as a multifunction peripheral selection screen illustrated in FIG. 10B. The modal M14 displays locations where the multifunction peripherals 30 are installed on different (same) floors in the same building, for example. The controller 11 stores information in which IP addresses and installation locations (names) of the multifunction peripherals 30 are associated with each other as multifunction peripheral registration information. When the address book of a multifunction peripheral is selected, the multifunction peripherals 30 that are selectable based on the registration information are displayed in the modal M14.

FIG. 10C is the same as FIG. 8A and is a diagram illustrating an example of a configuration of the address book display screen W30 for displaying an address book managed by one of the multifunction peripherals 30 (8F conference room A, for example) selected through the multifunction peripheral selection screen of the modal M14 of FIG. 10B. In this way, when registration information of the plurality of multifunction peripherals 30 is registered in advance and an address book of one of the multifunction peripherals 30 is selected as a transmission destination, the registered multifunction peripheral 30 is displayed in a selectable manner so that options of destination information for the user can be expanded.

2.4 Switching Between Address Book Managed by Terminal Device and Address Book Managed by Multifunction Peripheral In the section 2.4, a form in which display of the address book of the terminal device 10 being displayed is switched to the address book of the multifunction peripheral 30 is illustrated. Note that, when the address book of the multifunction peripheral 30 is being displayed, the display can be switched to the address book of the terminal device 10.

Figure 11C:
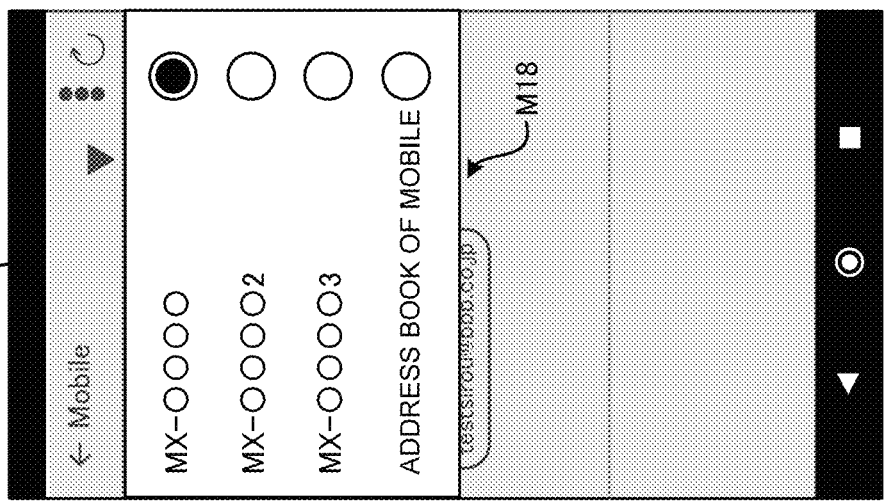
FIGS. 11A to 11C are diagrams illustrating an operation example according to the second embodiment.
Figure 11B:
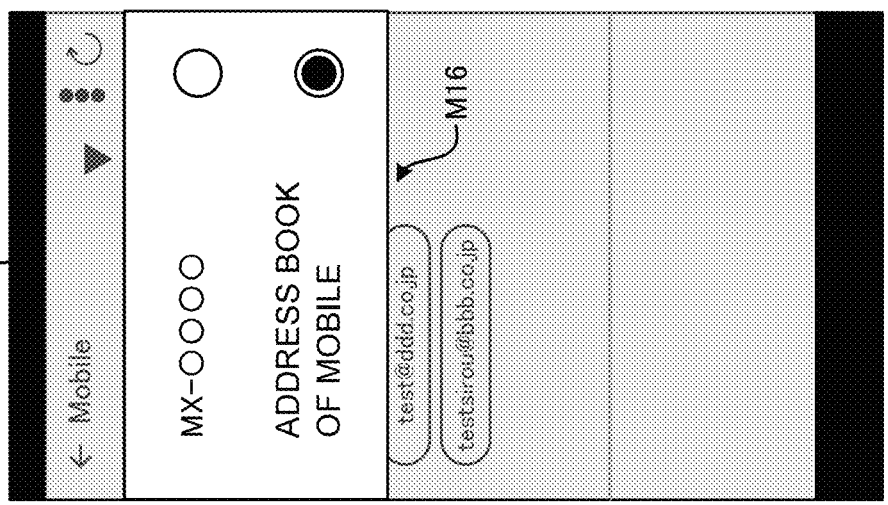
Figure 11A:
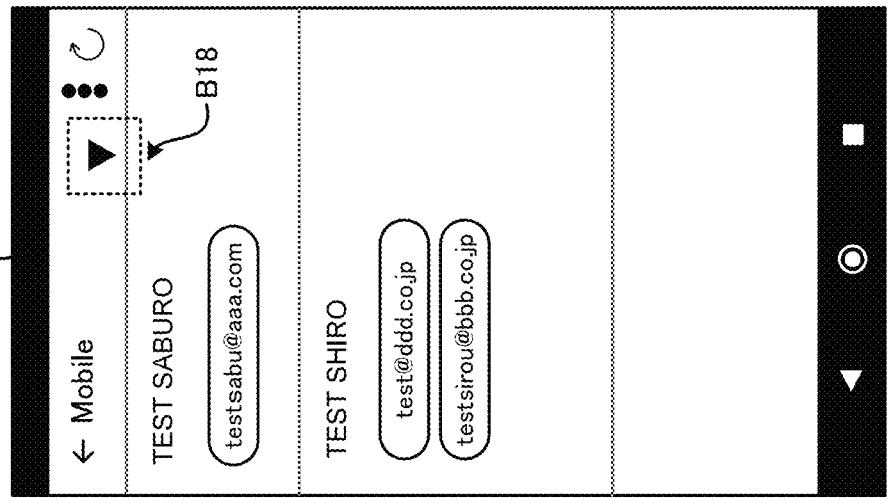

FIG. 11A is a diagram illustrating an example of a configuration of the address book display screen W40 that displays the address book managed by the terminal device 10. The address book display screen W40 includes a pull-down menu button B18. The pull-down menu button B18 is used to accept an instruction for displaying the modal M16 as a switching screen for accepting the switching of the address book to be displayed on the address book display screen W40.

FIG. 11B is a diagram illustrating a configuration of the modal M16 displayed by the controller 11 in response to a selection of the pull-down menu button B18. The modal M16 includes radio buttons that accept a selection of an address book to be displayed. In FIG. 11B, a state in which the address book of the terminal device 10 (mobile) is selected as an address book being displayed is illustrated. The user switches the address book to be displayed from the address book of the terminal device 10 to the address book of the multifunction peripheral 30 by selecting a radio button provided at the address book of the multifunction peripheral 30 represented by "MX-0000".

FIG. 11C is a diagram illustrating an example of a configuration of a modal M18 displayed by the controller 11 in response to a selection of the pull-down menu button B18 when a plurality of registration information of the multifunction peripherals 30 are registered. When a plurality of registration information of the multifunction peripherals 30 have been registered, different radio buttons corresponding to the different multifunction peripherals 30 are provided so that the address books of the registered multifunction peripherals 30 may be displayed. When selecting one of the radio buttons corresponding to one of the multifunction peripherals 30 which is desired to be displayed, the user can display the address book managed by the selected multifunction peripheral 30. As described above, since an address book being displayed on the address book display screen W40 is switchable, the user can display a desired address regardless of whether the address is of a terminal device or a multifunction peripheral.

2.5 Process for Registering Addresses Managed by Multifunction Peripheral to Terminal Device In the section 2.5, a form in which addresses managed by the multifunction peripheral 30 are registered in the terminal device 10 will be described.

FIG. 12A, which is the same as FIG. 9A, is a diagram illustrating an example of a configuration of the address book display screen W30 that displays the address book managed by the multifunction peripheral 30. Here, for example, when the user desires to register an email address "testtest@bbb.co.jp" having a username "Test Jiro" in the terminal device 10, the user taps or performs a long press on the email address so that the controller 11 displays a modal M20 as a confirmation screen illustrated in FIG. 12B.

The modal M20 displays a query to the user as to whether to register the e-mail address to be displayed in another device (the terminal device 10). When "Yes" is selected by the user in the modal M20, the controller 11 displays other devices available for the registration as illustrated in FIG. 12C. When the terminal device 10 (the address book of a mobile) is selected by the user, the controller 11 stores the e-mail address in the destination information storage region 217 managed by the controller 11 and displays the stored email address in the address book display screen W40.

In this way, the addresses managed by the multifunction peripheral 30 can be easily registered in the terminal device 10, and therefore, a time required to transmit a request for obtaining an address book as destination information to the multifunction peripheral 30 may be reduced after the registration of the address.

3. Third Embodiment

A third embodiment relates to an output system that includes a terminal device, a multifunction peripheral, and a network service, and the terminal device can execute a job of the multifunction peripheral through the network service. Furthermore, the terminal device can obtain an address book as destination information managed by the multifunction peripheral through the network service.

FIG. 13 is a diagram schematically illustrating an overall configuration of an output system 200 according to the third embodiment. The output system 200 includes a terminal device 50, a multifunction peripheral 70, and a network service 90. Note that, in the output system 200 according to the third embodiment, an external authentication server, not illustrated, or the like, may be separately installed to perform user authentication for the multifunction peripheral 70.

The multifunction peripheral 70 is connected to the network service 90 in a communication available manner via a network (NW) illustrated in solid lines in the figure. The terminal device 50 is connected to the network service 90 in a communication available manner via the network (NW). The terminal device 50 is configured to obtain apparatus information described below from the multifunction peripheral 70 (a dotted line in FIG. 13).

3.1 Functional Configuration

3.1.1 Terminal Device 50

Figure 14:
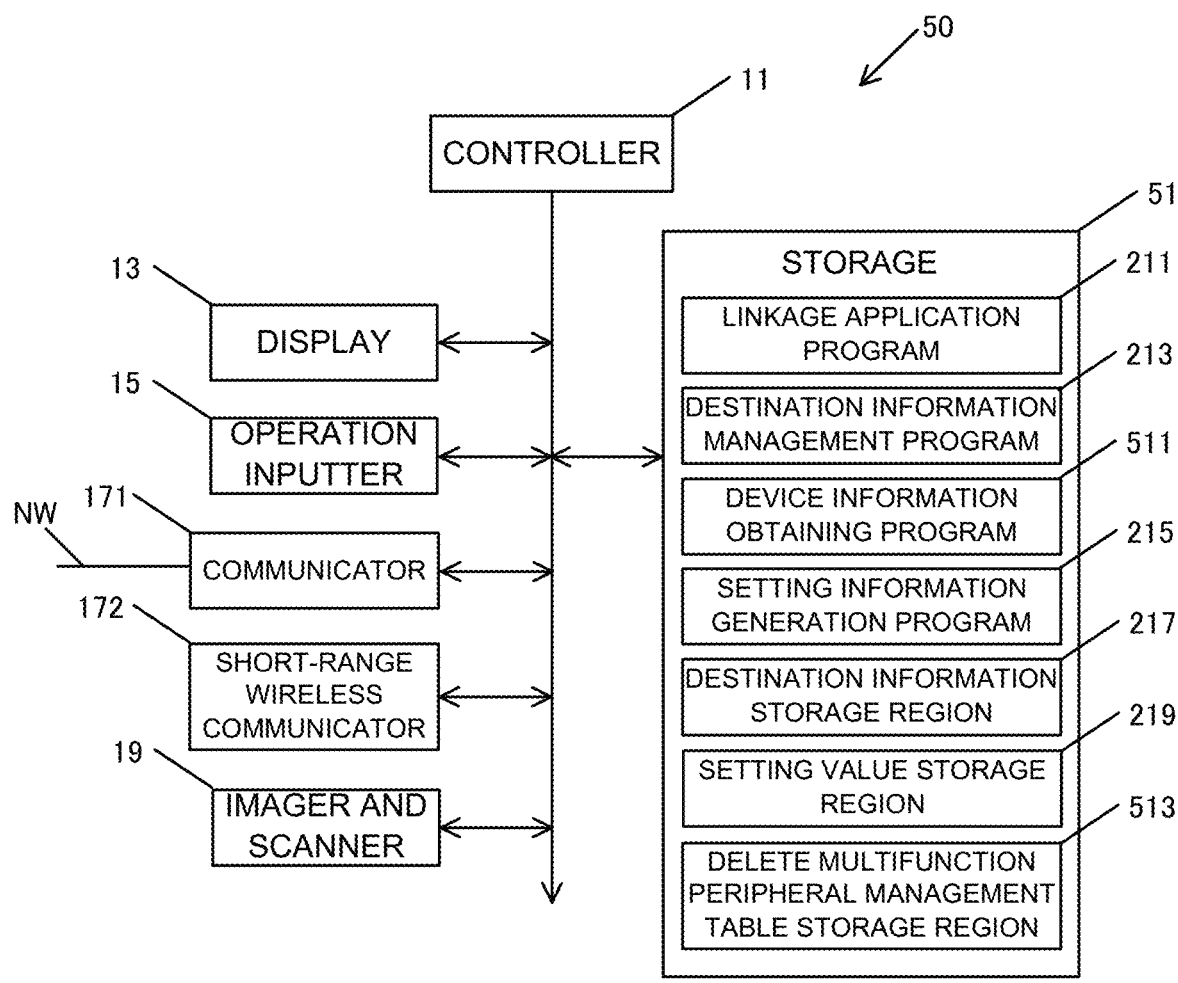
FIG. 14 is a diagram illustrating a functional configuration of a terminal device according to the third embodiment.

FIG. 14 is a diagram illustrating a functional configuration of the terminal device 50 according to the third embodiment. In a description with reference to FIG. 14, the same configurations as those of the terminal device 10 according to the first embodiment are denoted by the same reference numerals, and descriptions thereof are omitted.

The terminal device 50 includes, in addition to the configuration of the terminal device 10, an imager/scanner 19 and a storage 51 serving as a second storage instead of the storage 21 of the terminal device 10.

Examples of the imager/scanner 19 include an imaging device, such as a camera, and a scanning device using a laser beam. Note that the imager/scanner 19 is not particularly limited as long as apparatus information of the multifunction peripheral 70 can be obtained. Furthermore, the short-range wireless communicator 172 may be used when apparatus information of the multifunction peripheral 70 can be obtained.

According to the third embodiment, the storage 51 stores a linkage application program 211, a destination information management program 213, an apparatus information obtaining program 511, and a setting information generation program 215 and ensures a destination information storage region 217, a setting value storage region 219, and a multifunction peripheral management table storage region 513.

The apparatus information obtaining program 511 is read by the controller 11 to obtain apparatus information from the multifunction peripheral 70. After reading the apparatus information obtaining program 511, the controller 11 controls the imager/scanner 19 or the short-range wireless communicator 172 to obtain apparatus information of the multifunction peripheral 70.

Furthermore, the controller 11, which has read the linkage application program 211 according to the third embodiment, extracts a device ID or a session key as identification information of the multifunction peripheral 70 from the apparatus information obtained from the multifunction peripheral 70 and transmits the identification information to the network service 90 with setting information.

FIG. 15 is a diagram illustrating a configuration example of a combination of setting information and connection information to be transmitted by the terminal device 50 to the network service 90. In FIG. 15, as an example, a combination of setting information including a group of "mode", "transmission destination", "setting of reading", "image orientation", and "color mode" that are input and selected through the application screen or the scan job execution screen and connection information including a device ID "jv6 Ou3QBGv8w6yNtGt" and a session key "1qazxsw23edcvfr45tgbnhy67ujm,ki8 -" is transmitted.

The multifunction peripheral management table storage region 513 stores, for example, information obtained by associating identification information of the multifunction peripheral 70 (e.g., an identification ID, an IP address, or the like) and an installation location (name) with each other as registration information of a multifunction peripheral.

3.1.2 Multifunction Peripheral 70

Figure 16:
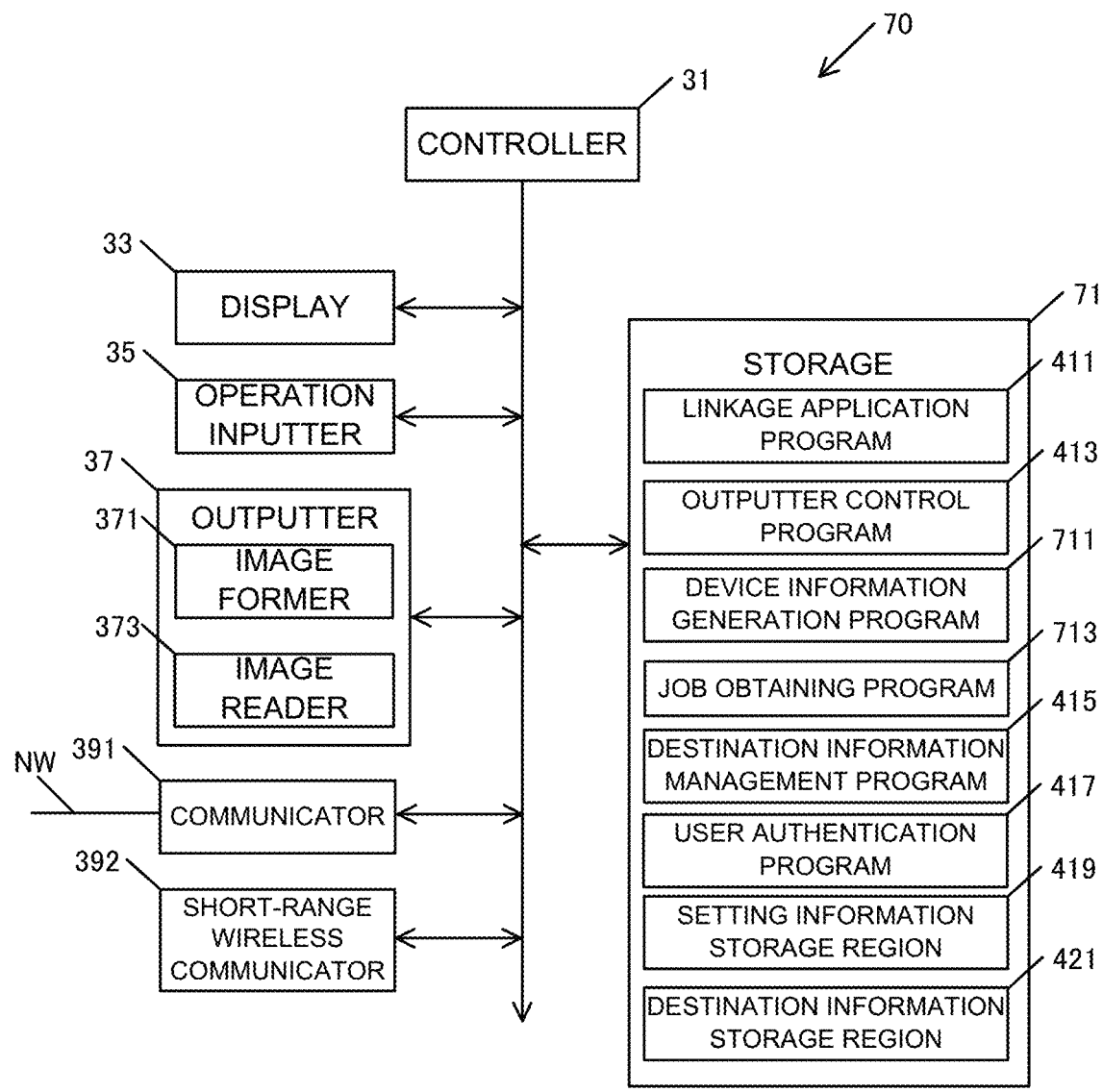
FIG. 16 is a diagram illustrating a functional configuration of a multifunction peripheral according to the third embodiment.

FIG. 16 is a diagram illustrating a functional configuration of the multifunction peripheral 70 according to the third embodiment. In the description in FIG. 16, the same portions as those of the multifunction peripheral 30 according to the first embodiment may be denoted by the same reference numerals, and descriptions thereof are omitted.

The multifunction peripheral 70 includes a storage 71 instead of the storage 41 of the multifunction peripheral 30. According to the third embodiment, the storage 71 stores a linkage application program 411, an outputter control program 413, an apparatus information generation program 711, a job obtaining program 713, a destination information management program 415, and a user authentication program 417 and ensures a setting information storage region 419 and a destination information storage region 421.

The apparatus information generation program 711 is read by the controller 31 to generate apparatus information including identification information of the multifunction peripheral 70. The apparatus information according to the present disclosure includes at least items associated with settings of the multifunction peripheral 70 that are required for inputting setting information in the terminal device 50 and items associated with connection to the network service 90, such as the identification information of the multifunction peripheral 70 and a session key. The controller 31 as a job controller, which reads the apparatus information generation program 711, generates these information items as encoded information, or characters (numbers, alphabets, kana, hiragana, Chinese characters, symbols, etc.) Examples of the encoded information include a one-dimensional code, such as a bar code (e.g., an EAN code, a JAN code, Codabar, CODE128, etc.), or a two-dimensional code. Examples of the two-dimensional code include a stacked two-dimensional code (e.g., PDF417 or CODE49), or a matrix two-dimensional code (e.g., a quick response code (QR Code (registered trademark)), DataMatrix, VeriCode, or Aztec) In the following, the third embodiment will be described using a quick response code (QR code (registered trademark)) as an example.

The controller 31 updates the apparatus information on a regular or irregular basis. For example, the controller 31 may update the apparatus information in order to cope with a new function that is added when a driver program of the multifunction peripheral 70 is updated. Furthermore, the controller 31 updates the apparatus information when the information associated with connection to the network service 90 is updated or changed, when an installation location of the multifunction peripheral 70 is changed, or the like.

Here, a configuration example of the apparatus information according to the third embodiment will be described with reference to FIG. 17. The apparatus information illustrated in FIG. 17 includes interface (I/F)-related items "name", "type", and "version", multifunction peripheral-related items "color mode", "transmission destination", "setting of reading", "image orientation", and the like, and connection-related items "device ID", "session key", "installation country", and the like, that are described in specific formats. The terminal device 50 may read and decode the encoded apparatus information to obtain the apparatus information of the multifunction peripheral 70. The terminal device 50 may be connected to the network service 90 based on the connection-related items (the device ID and the session key) of the obtained apparatus information.

The apparatus information items and values thereof illustrated in FIG. 17 are only examples, and the apparatus information according to the present disclosure is not limited to the description in FIG. 17. For example, in a case where an authentication operation for the multifunction peripheral 70 is required when a job execution instruction is issued by the terminal device 50, the apparatus information may include PIN (personal identification number), a one-time password generated by a token, or the like.

The job obtaining program 713 is read by the controller 31 to obtain a job based on setting information set in the terminal device 50 from the network service 90. When a job is transmitted from the terminal device 50 to the multifunction peripheral 70, the controller 31 that has read the job obtaining program 713 performs an HTTPS (hyper text transfer protocol secure) long polling communication, for example, with the network service 90 so as to obtain the job.

3.1.3 Network Service 90

The network service 90, which is a so-called cloud, is a computing system which provides a predetermined service, such as processing resources, storage resources, and delivery resources, via a web browser, for example. The service provided by the network service 90 may be used by access from the terminal device 50 or the multifunction peripheral 70 via the network (NW) using any data communication protocol, such as a transmission control protocol, an Internet protocol, or other protocols. The network service 90 includes one or more network devices as hardware. Note that, in the following description, when a special hardware configuration is not particularly described, the simple network service 90 will be described.

Figure 18:
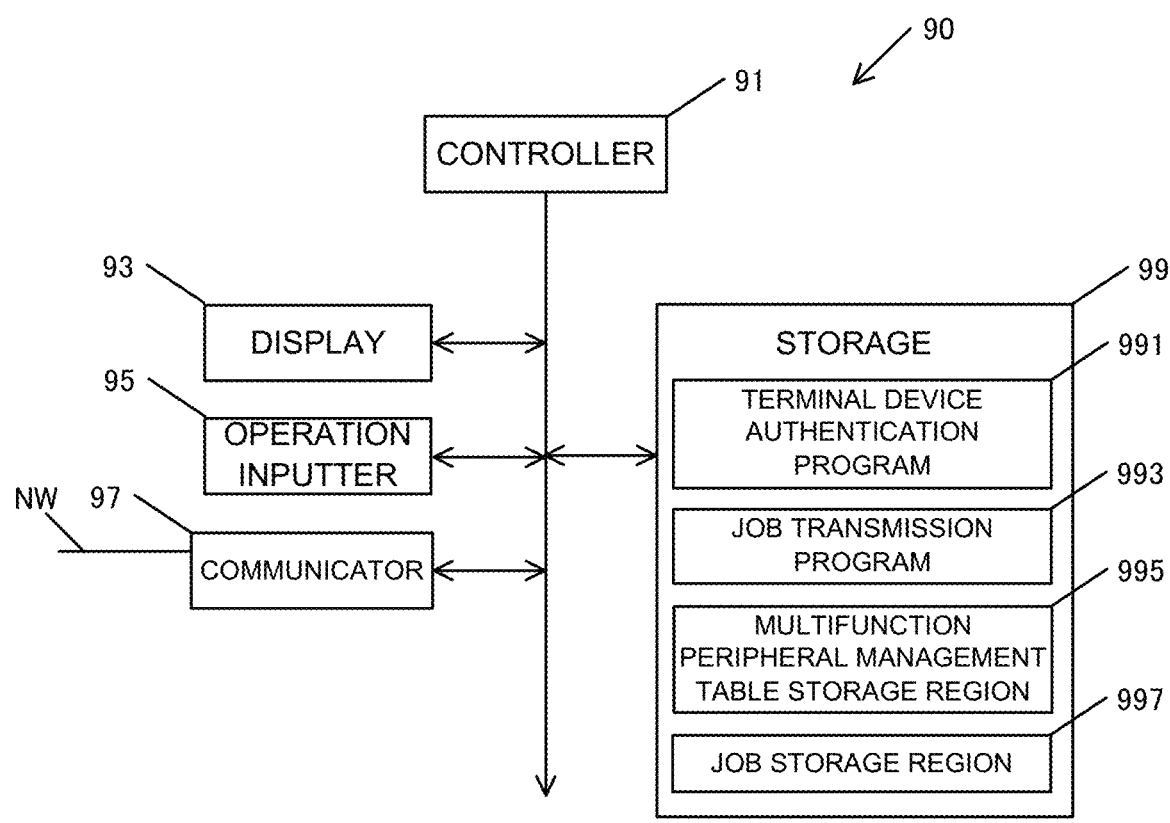
FIG. 18 is a diagram illustrating a functional configuration of a network service according to the third embodiment.

FIG. 18 is a diagram illustrating a functional configuration of the network service 90 according to the third embodiment. The network service 90 includes a controller 91, a display 93, an operation inputter 95, a communicator 97, and a storage 99.

The controller 91 controls the overall network service 90. The controller 91 includes, for example, one or more arithmetic devices (CPUs, etc.), and the controller 91 reads and executes various programs stored in the storage 99 to perform functions.

The display 93 displays various types of information to the user or the like. The display 93 may be constituted by, for example, an LCD or an organic EL display.

The operation inputter 95 accepts input of information performed by the user or the like. An input device, such as a keyboard and a mouse, may be used as the operation inputter 95.

The communicator 97 includes a wired or wireless interface or both wired and wireless interfaces to communicate with other devices via a LAN, a WAN, the Internet, a telephone line, etc.

The storage 99 stores various programs and various types of data required for operation of the network service 90. The storage 99 may include a storage device, such as a RAM, an HDD, an SSD, or a ROM.

According to the third embodiment, the storage 99 stores a terminal device authentication program 991 and a job transmission program 993 and ensures a multifunction peripheral management table storage region 995 and a job storage region 997.

The terminal device authentication program 991 is read by the controller 91 to authenticate a connection with the terminal device 50. After reading the terminal device authentication program 991, the controller 91 authenticates a connection with the terminal device 50 based on a session key of the connection information transmitted together when setting information is transmitted from the terminal device 50.

The job transmission program 993 is read by the controller 91 to transmit a job to the multifunction peripheral 70.

After reading the job transmission program 993, the controller 91 searches for a job ID assigned to the multifunction peripheral 70 in response to HTTPS long polling from the multifunction peripheral 70. When setting information is associated with the job ID, the controller 91 establishes a connection with the multifunction peripheral 70 and transmits the setting information as a job.

The multifunction peripheral management table storage region 995 stores, for example, the identification information of the multifunction peripheral 70 (e.g., the identification ID and the IP address, etc.) and the destination information (an address book) managed by the multifunction peripheral 70 that are associated with each other. In this case, information on an installation location (name) where the multifunction peripheral 70 is installed may be further added and stored as the registration information for the multifunction peripheral.

As illustrated in FIG. 19, the job storage region 997 stores the connection information and the setting information transmitted from the terminal device 50 to which a job ID is assigned by the controller 91. The job ID may be assigned by the terminal device 50. In this case, the terminal device 50 associates the connection information with the setting information and assigns the job ID before transmitting the connection information and the setting information to the network service 90. The controller 91 stores, in the job storage region 997, the connection information and the setting information which have the job ID assigned thereto as a job.

3.2 Processing Flow

3.2.1 Overall Processing

Figure 20:
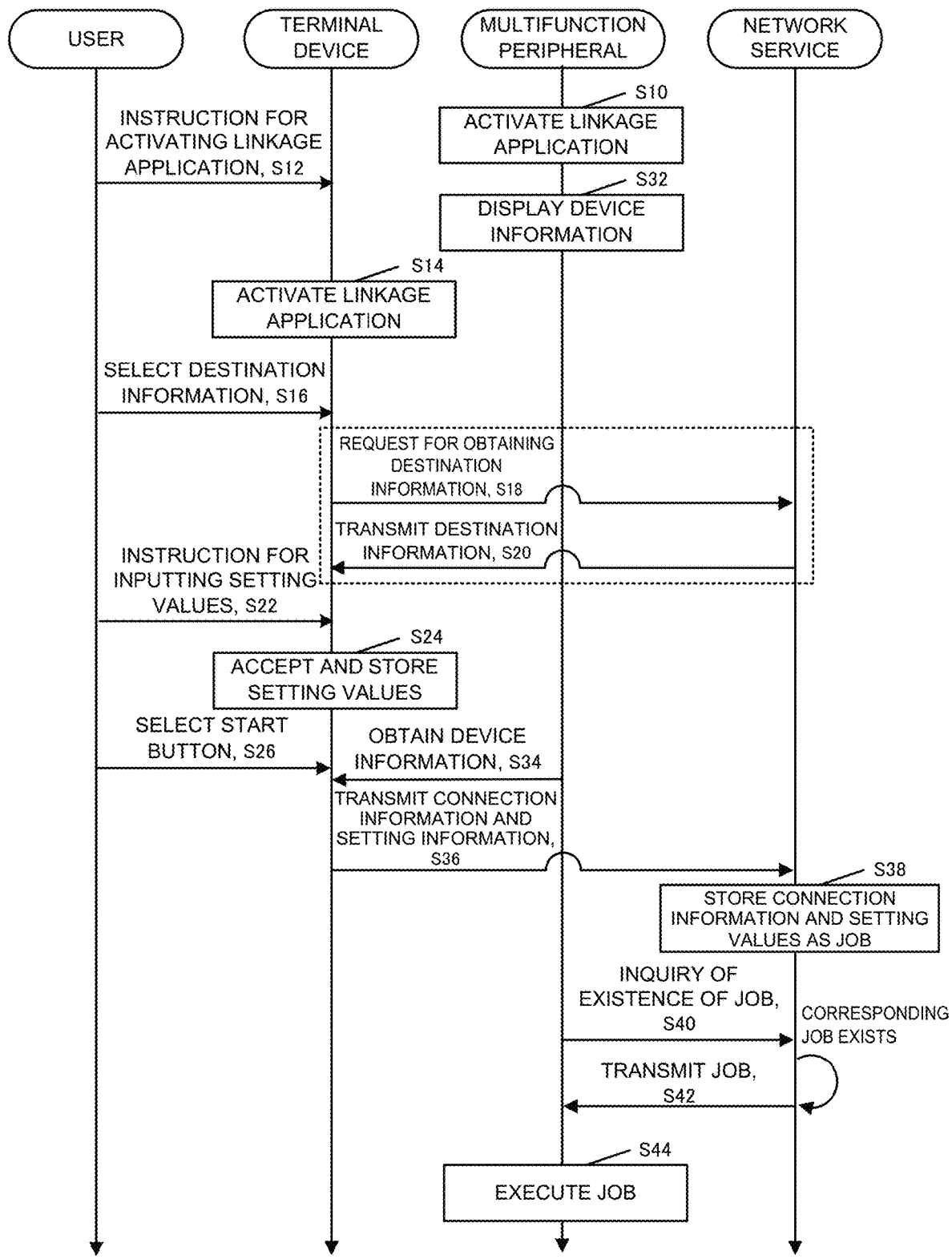
FIG. 20 is a flowchart illustrating an overall process according to the third embodiment.

Next, overall processing according to the third embodiment will be described with reference to a flowchart in FIG. 20. Note that, in FIG. 20, a form of execution of a job (hereinafter referred to as a "transmission job" where appropriate) using destination information in a scan mode, a fax mode, or the like will be described. The same step numbers are assigned to describe the same processing steps as those of the first embodiment described referring to FIG. 4. Furthermore, it is assumed that the network service 90 according to the third embodiment stores destination information (an address book) managed by the multifunction peripheral 70 in advance.

First, the controller 31 of the multifunction peripheral 70 activates a linkage application based on an activation instruction issued by the user (step S10). Note that the linkage application of the multifunction peripheral 70 may be activated not only by an activation instruction input by the user but also in an automatic manner when the device is activated, when restoration from a sleep mode is performed, when auto clear is performed, or when user authentication is successfully performed in an enabled authentication mode.

The controller 31 of the multifunction peripheral 70 generates apparatus information based on the read apparatus information generation program 711 and displays the apparatus information on the display 33 (step S32).

The user inputs an instruction for activating the linkage application by operating the terminal device 50 (step S12).

Upon receiving an activation instruction issued by the user, the controller 11 of the terminal device 50 activates the linkage application by reading the linkage application program 211 (step S14).

The user selects destination information as a transmission destination for transmitting scan data or fax data via an application screen or a job execution screen provided by the linkage application of the terminal device 50 (step S16).

Here, the controller 11 of the terminal device 50 transmits a request for obtaining destination information to the network service 90 based on registration information of the multifunction peripheral 70 stored in the multifunction peripheral management table storage region 513 where appropriate to display destination information managed by the controller 31 of the multifunction peripheral 70 in a selectable manner in addition to management information managed by the controller 11 (step S18).

The controller 91 of the network service 90 transmits the destination information of the multifunction peripheral 70 managed by the controller 91 to the terminal device 50 in response to the request for obtaining destination information from the terminal device 50 (step S20).

The user selects destination information as a transmission destination from among the destination information managed by the controller 11 of the terminal device 50 and the destination information obtained from the network service 90, and inputs various setting values required for execution of a job (step S22).

The controller 11 of the terminal device 50 receives the selected destination information and the input setting values and stores the destination information and the setting values in the destination information storage region 217 and the setting value storage region 219, respectively (step S24).

When a start button is selected by the user, the controller 11 obtains apparatus information displayed on the display 33 of the multifunction peripheral 70 (step S26→step S34).

Then, the controller 11 extracts connection-related items (a device ID, a session key, etc.) from the apparatus information obtained in step S34, and transmits the connection information and the setting information to the network service 90 (step S36).

The network service 90 assigns a job ID to the connection information and the setting information transmitted from the terminal device 50 and stores the connection information and the setting information as a job (step S38).

The multifunction peripheral 70 executes the HTTPS long polling with the network service 90 and inquires whether a job of the multifunction peripheral 70 exists (step S40).

When the job of the multifunction peripheral 70 exists, the network service 90 establishes a connection with the multifunction peripheral 70 and transmits the job (step S42).

The multifunction peripheral 70 executes the received job (step S44).

3.2.2 Processing of Terminal Device 50

Next, processing of the terminal device 50 according to the third embodiment will be described with reference to a flowchart of FIG. 21. The same step numbers are assigned to describe the same processing steps as those of the first embodiment described with reference to FIG. 5.

The controller 11 determines whether an instruction for activating the linkage application has been input by the user (step S100).

When it is determined that an input of the instruction for activating the linkage application has been received, the controller 11 reads the linkage application program 211 so as to activate the linkage application. When the linkage application is activated, the controller 11 generates an application screen for accepting settings of a job to be executed by the multifunction peripheral 70 and displays the application screen via the display 13 (step S100; Yes→step S102). On the other hand, when it is determined that input of the instruction for activating the linkage application has not been received, the controller 11 waits until the activation instruction is input (step S100; No).

Subsequently, the controller 11 determines whether a job selected via the application screen corresponds to a transmission job (step S104).

When it is determined that the selected job corresponds to a transmission job, the controller 11 displays a transmission execution screen (step S104; Yes→step S106). On the other hand, when it is determined that the selected job is not a transmission job, the controller 11 displays an execution screen for another job (e.g., a copy job) and executes the other job (step S104; No→"execute another job").

Then, the controller 11 determines whether an instruction for selecting destination information has been input through the displayed transmission execution screen (step S108). When it is determined that the instruction for selecting destination information has been input, the controller 11 displays a destination information selection screen (step S108; Yes→step S128).

Note that, when a destination information selection screen is displayed, the controller 11 transmits a request for obtaining destination information to the network service 90 based on registration information of the multifunction peripheral 70 stored in the multifunction peripheral management table storage region 513 where appropriate to display destination information managed by the multifunction peripheral 70 in a selectable manner in addition to management information managed by the controller 11. After obtaining the destination information from the network service 90, the controller 11 displays the destination information obtained from the network service 90 in a selectable manner in addition to the destination information managed by the controller 11.

On the other hand, when it is determined that no instruction for selecting destination information has been input, the controller 11 proceeds to step S118 (step S108; No→step S118). Here, when no destination information selection instructions have been input, settings based on a preceding transmission job that has been executed can be reproduced on the transmission execution screen, and therefore, destination information associated with the preceding transmission job is not required to be input again.

Then, the controller 11 determines whether the user has selected destination information managed by the terminal device 50 (step S112).

When it is determined that destination information of the terminal device 50 has been selected, the controller 11 receives the selected destination information of the terminal device 50 (step S112; Yes→step S114).

On the other hand, when it is determined that destination information of the multifunction peripheral 70 has been selected, the controller 11 receives the selected destination information of the multifunction peripheral 70 (step S112; No→step S116).

Subsequently, the controller 11 accepts the input of the setting values for executing the transmission job and stores the setting values in the setting value storage region 219 (step S118→step S120).

Then, the controller 11 determines whether the start button has been selected by the user as a job execution instruction (step S122). When it is determined that the start button has been selected by the user, the controller 11 generates setting information using the selected destination information and the setting values stored in the setting value storage region 219 (step S122; Yes→step S124). On the other hand, when it is determined that the start button has not been selected, the controller 11 waits until the start button is selected (step S122; No).

Thereafter, the controller 11 reads the apparatus information obtaining program 511 and obtains the apparatus information of the multifunction peripheral 70 by controlling the imager/scanner 19 or the short-range wireless communicator 172 (step S130).

The controller 11 transmits the generated setting information and the connection information extracted from the apparatus information to the multifunction peripheral 70, and terminates the process (step S132).

Next, a process associated with the display of a destination information selection screen performed in step S128 of FIG. 21 will be described with reference to a flowchart of FIG. 22.

Figure 21:
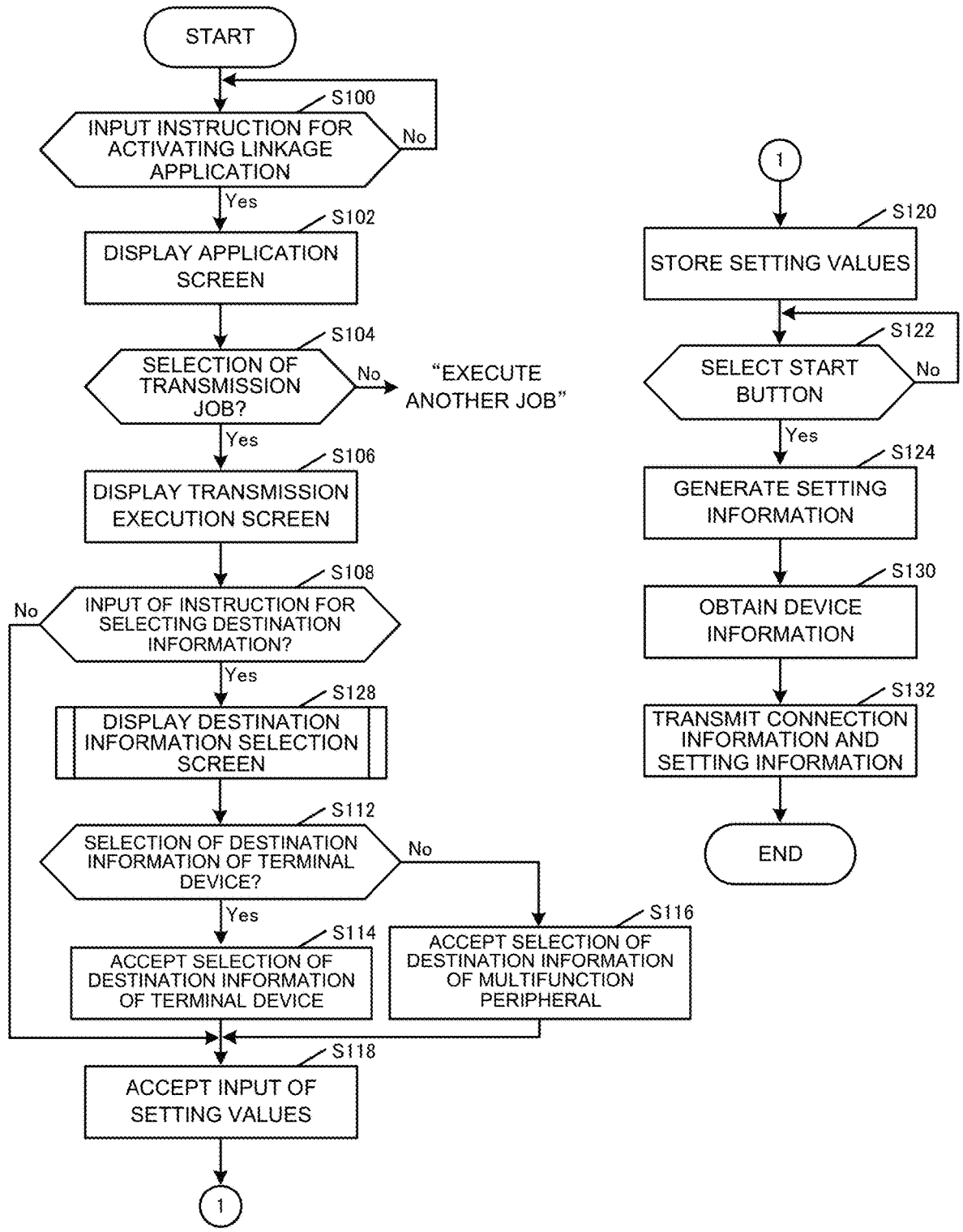
FIG. 21 is a flowchart illustrating a process of the terminal device according to the third embodiment.

In step S108 of FIG. 21, when the user inputs an instruction for selecting destination information, the controller 11 determines whether destination information of the terminal device 50 to be displayed exists (step S1280). In this case, the controller 11 checks the destination information managed by itself in the destination information storage region 217.

When it is determined that destination information to be displayed exists, the controller 11 determines the destination information of the terminal device 50 to be displayed (step S1280; Yes→step S1281). On the other hand, when it is determined that destination information to be displayed does not exist, the controller 11 proceeds to step S1283 (step S1280; No→step S1283).

Next, the controller 11 determines whether a multifunction peripheral 70 has been registered in advance (step S1283). In this case, the controller 11 can determine whether the multifunction peripheral 70 has been registered with reference to the registration information of the multifunction peripheral 70 stored in the multifunction peripheral management table storage region 513.

When it is determined that the multifunction peripheral 70 has been registered in advance, the controller 11 determines whether destination information of the multifunction peripheral 70 can be obtained from the network service 90 (step S1283; Yes→step S1285).

When it is determined that the destination information of the multifunction peripheral 70 can be obtained from the network service 90, the controller 11 obtains the destination information of the multifunction peripheral 70 from the network service 90 and determines the destination information of the multifunction peripheral 70 to be displayed (step S1285; Yes→step S1287).

On the other hand, when it is determined that any multifunction peripheral 70 has not been registered in advance (step S1283; No) or when it is determined that obtainment of the destination information of the multifunction peripheral 70 from the network service 90, is not available (step S1285; No), the controller 11 directly obtains the destination information from the multifunction peripheral 70 to be connected (step S1289).

The controller 11 then determines the destination information of the multifunction peripheral 70 to be displayed (step S1287).

3.2.3 Process of Multifunction Peripheral 70

Figure 23:
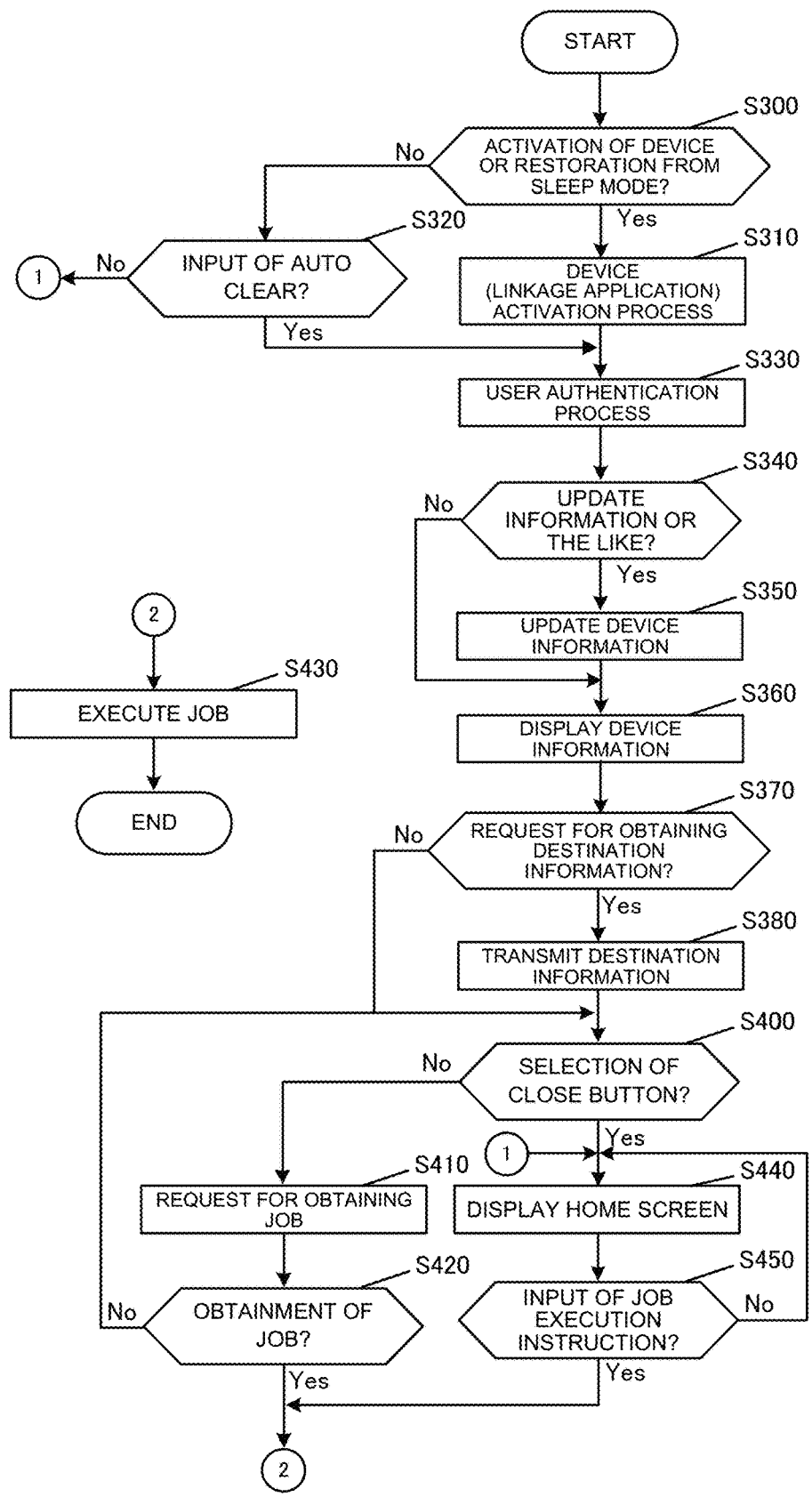
FIG. 23 is a flowchart illustrating a process of the multifunction peripheral according to the third embodiment.

Next, a process of the multifunction peripheral 70 will be described with reference to a flowchart in FIG. 23. The controller 31 of the multifunction peripheral 70 determines whether a device state is device activation or recovery from a sleep mode (step S300).

When it is determined that the device state is device activation or recovery from a sleep mode, the controller 31 reads the linkage application program 411 and activates the linkage application (step S300; Yes→step S310).

On the other hand, when it is determined that the device state is not device activation or recovery from a sleep mode, the controller 31 determines whether the device state is an input of auto clear (step S300; No→step S320).

When it is determined that the device state is an input of auto clear, the controller 11 proceeds to step S330 (step S320; Yes→step S330). On the other hand, when it is determined that the device state is not an input of auto clear, the controller 11 proceeds to step S440 (step S320; No→step S440).

Then the controller 31 performs a user authentication process (step S330). For example, when the authentication process is performed based on authentication information input via a login screen, the controller 31 stores a login user name and a login password in association with each other in advance. Then, the user authentication may be performed by checking the login user name and the login password as the authentication information input via the login screen.

After the user authentication process is terminated, the controller 31 determines whether information on a driver program, information on a connection to the network service 90, etc. have been updated (step S340). When the information and the like have been updated, the controller 31 reads the apparatus information generation program 711 to update the apparatus information based on the updated information (step S340; Yes→step S350).

Then, the controller 31 displays a display screen including the apparatus information updated in step S350 on the display 33 (step S360).

On the other hand, when the information or the like has not been updated, the controller 31 does not update the apparatus information but displays the apparatus information on the display 33 (step S340; No→step S360).

Subsequently, the controller 31 determines whether a request for obtaining destination information has been received from the terminal device 50 (step S370). When it is determined that the request for obtaining destination information has been received, the controller 31 transmits destination information managed by itself to the terminal device 50 (step S370; Yes→step S380). On the other hand, when it is determined that the request for obtaining destination information has not been received, the controller 31 proceeds to step S400 (step S370; No→step S400).

Subsequently, the controller 31 determines whether a "close button" provided on the display screen including the apparatus information has been selected (step S400). When the "close button" has not been selected, the controller 31 issues a request for obtaining a job (step S400; No→step S410). Specifically, the controller 31 reads the job obtaining program 713 to perform HTTPS polling communication with the network service 90. The HTTPS polling communication with the network service 90 may be continuously performed before the "close button" is selected in step S400, for example, after the device activation process in step S310, for example.

Then, the controller 31 determines whether a job has been obtained (step S420). When it is determined that the job has been obtained from the network service 90, the controller 31 executes the obtained job and terminates the process (step S420; Yes→step S430). Note that, when it is determined that no job has been obtained from the network service 90, the controller 31 returns to step S400 (step S420; No→step S400).

Here, when the "close button" is selected, the controller 31 displays the home screen (step S400; Yes→step S440). In this case, the controller 31 does not output a job that is transmitted from the terminal device 50 and obtained through the network service 90.

Then, the controller 31 determines whether an instruction for executing a job has been received via the home screen (step S450). When it is determined that the instruction for executing a job has been input by the user via the home screen, the controller 31 executes the job and terminates the process (step S450; Yes→step S430).

3.2.4 Processing of Network Service 90

Figure 24:
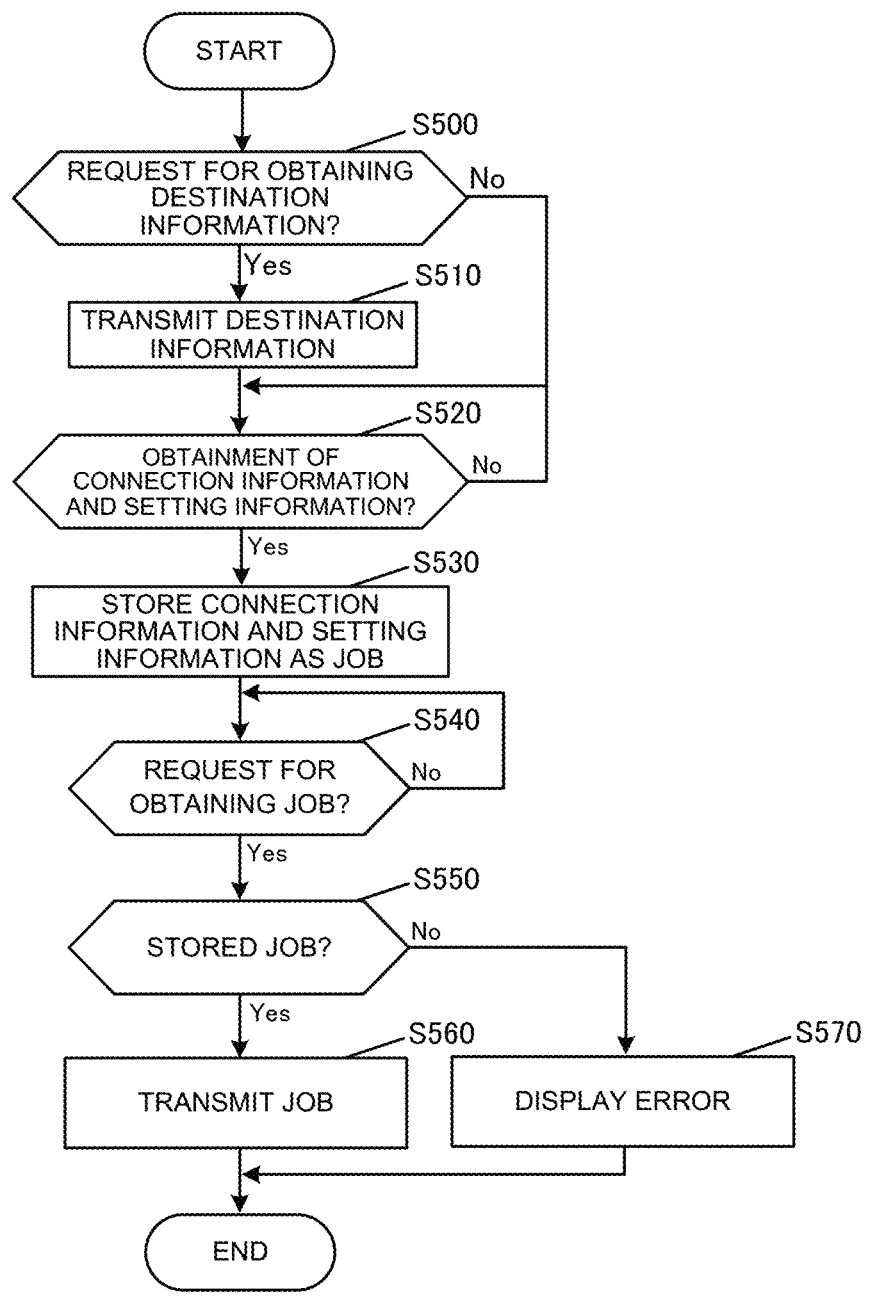
FIG. 24 is a flowchart illustrating a process of a network service according to the third embodiment.

Next, processing of the network service 90 will be described with reference to FIG. 24. The controller 91 of the network service 90 determines whether a request for obtaining destination information has been received from the terminal device 50 (step S500).

When it is determined that the request for obtaining destination information has been received, the controller 91 transmits destination information of the multifunction peripheral 70 stored in the multifunction peripheral management table storage region 995 to the terminal device 50 (step S500; Yes→step S510). On the other hand, when it is determined that the request for obtaining destination information has not been received, the controller 91 proceeds to step S520 (step S500; No→step S520).

Subsequently, the controller 91 determines whether connection information and setting information have been obtained from the terminal device 50 (step S520).

When it is determined that the connection information and the setting information have been obtained, the controller 91 assigns a job ID to the connection information with the setting information to be stored in the job storage region 997 (step S520; Yes→step S530). On the other hand, when it is determined that the connection information or the setting information has not been obtained, the controller 91 waits until the connection information and the setting information are obtained (step S520; No).

Subsequently, the controller 91 determines whether a job obtaining request has been received from the multifunction peripheral 70 (step S540).

When it is determined that the job obtaining request has been received, the controller 91 determines whether a job corresponding to the multifunction peripheral 70 which has issued the obtaining request is stored (step S540; Yes→step S550). On the other hand, when it is determined that the request for obtaining a job has not been received, the controller 91 waits until the request for obtaining a job is received (step S540; No).

When it is determined that the job corresponding to the multifunction peripheral 70 which has issued the obtaining request is stored, the controller 91 transmits the job to the multifunction peripheral 70 (step S550; Yes→step S560). On the other hand, when it is determined that the job corresponding to the multifunction peripheral 70 which has issued the obtaining request is not stored, the controller 91 performs error display and terminates the process (step S550; No→step S570).

3.3 Operation Examples

Next, an operation example according to the third embodiment will be described. Note that, in the third embodiment, descriptions of screens having substantially the same screen configurations as the application screen W10 and the scan job execution screen W20 illustrated in FIG. 7 and the like of the first embodiment, and the address book display screen W30 illustrated in FIG. 8 and the like are omitted herein.

Figure 25:
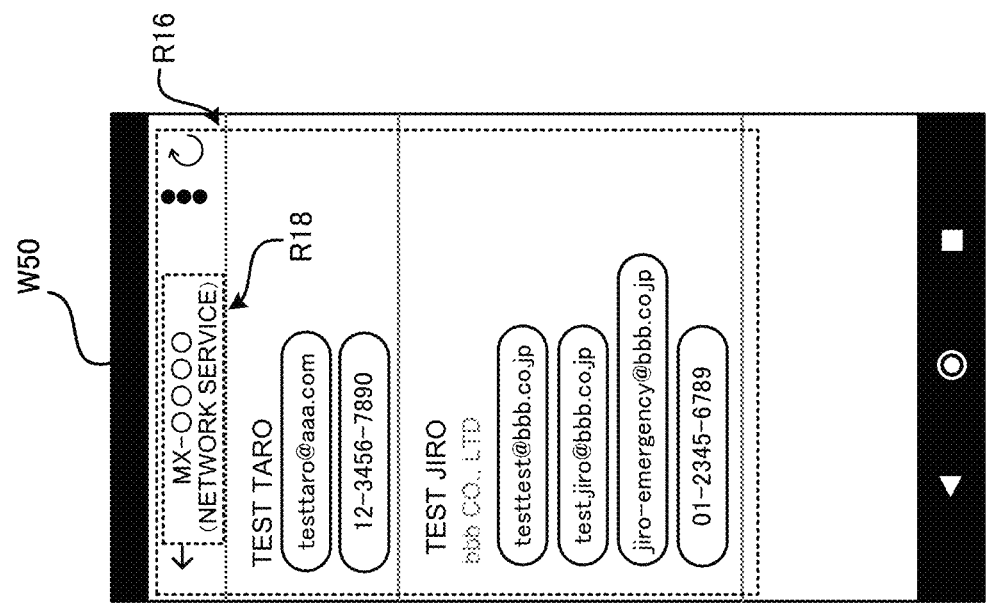
FIG. 25 is a diagram illustrating an operation example according to the third embodiment.

FIG. 25 is a diagram illustrating an example of a screen configuration of an address book display screen W50 according to the third embodiment. As described above, the address book display screen W50 has substantially the same configuration as the address book display screen W30 of the first embodiment. However, according to the third embodiment, destination information (an address book) of the multifunction peripheral 70 obtained from the network service 90 can be obtained. Therefore, it is preferable that an identifier, such as "network service", is additionally displayed in a device name display region R18 so that it can be determined whether an address book being displayed on the address book display screen W50 has been supplied from the network service 90. Note that the identifier may be a character string, as illustrated in FIG. 25, or may be a graphic, a symbol, or the like.

Figure 26:
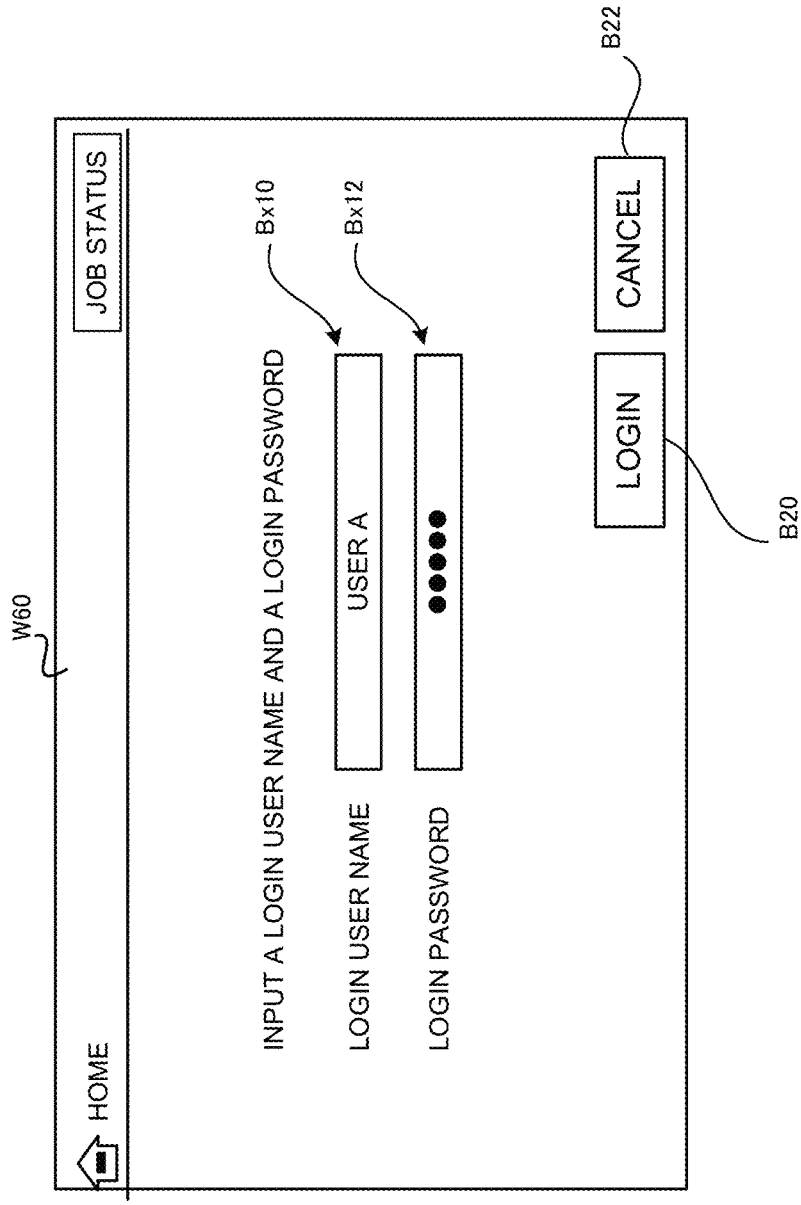
FIG. 26 is a diagram illustrating an operation example according to the third embodiment.

FIG. 26 is a diagram illustrating an example of a configuration of a login screen W60 displayed on the display 33 when the controller 31 of the multifunction peripheral 70 reads the user authentication program 417. Note that this operation corresponds to the process in step S330 of FIG. 23.

A login screen W60 includes a login user name input box Bx10, a login password input box Bx12, a login button B20, and a cancel button B22.

The login user name input box Bx10 receives an input of a login user name of a user who attempts to log into the multifunction peripheral 70.

The login password input box Bx12 receives an input of a login password associated with the login user name of the user who attempts to log into the multifunction peripheral 70.

The login button B20 accepts an instruction for confirming content input to the login user name input box Bx10 and the login password input box Bx12 by the user. The cancel button B22 receives an input of an instruction for cancelling a login process. The user inputs the login user name in the login user name input box Bx10 and the login password in the login password input box Bx12 and then selects the login button B20 so as to input an instruction for executing the login process.

Figure 27:
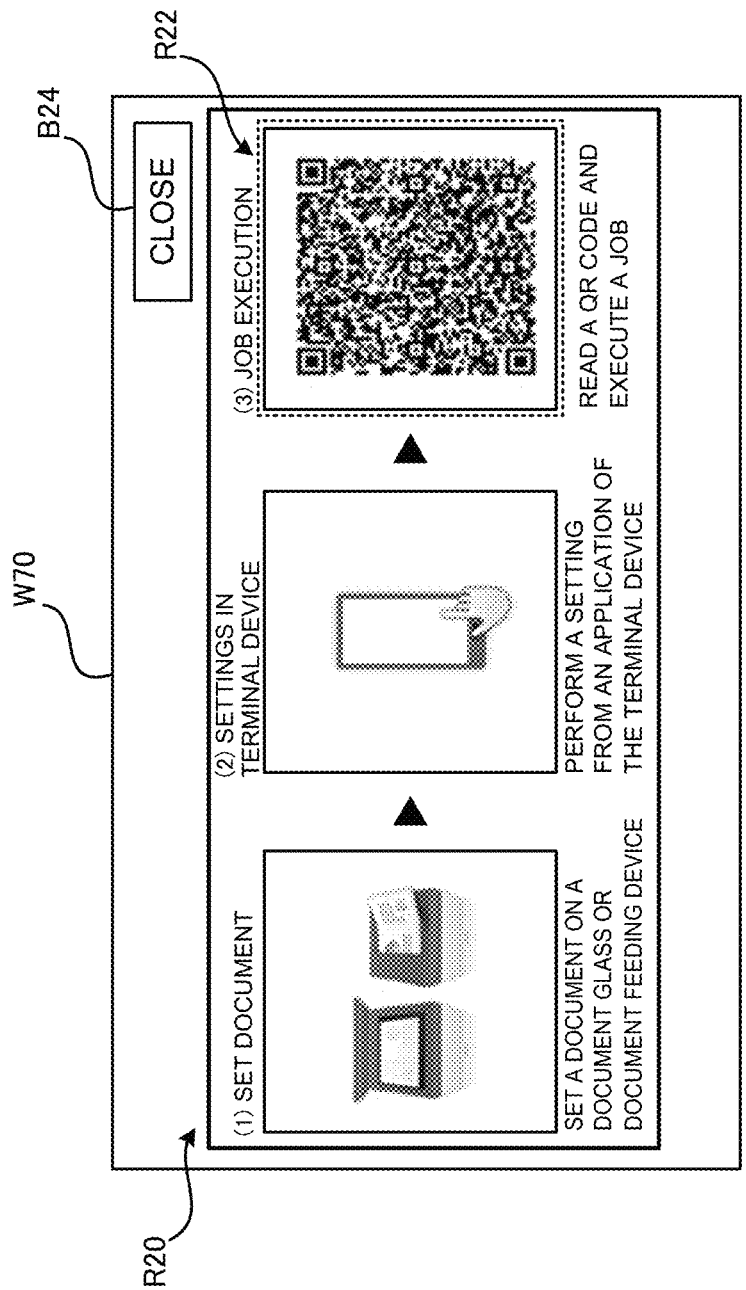
FIG. 27 is a diagram illustrating an operation example according to the third embodiment.

FIG. 27 is a diagram illustrating an example of a configuration of a display screen W70 that is displayed on the display 33 by the multifunction peripheral 70. Note that this operation example corresponds to the process in step S360 of FIG. 23.

The display screen W70 includes an operation procedure display region R20 and a close button B24. The operation procedure display region R20 is used for describing an operation procedure of an output method according to the third embodiment by illustrations or animations. In the example illustrated in FIG. 27, the operation procedure is explained in the following order: (1) set document, (2) settings in terminal device, and (3) job execution.

The operation procedure display region R20 includes an apparatus information display region R22 that displays the apparatus information of the multifunction peripheral 70. According to the third embodiment, an example in which a quick response (QR) code is employed as encoded information representing the apparatus information will be described. The QR Code (registered trademark) is a two-dimensional code representing data in a graphical form.

The terminal device 50 causes the imager/scanner 19 including an imaging device, such as a camera, and a scanning device using a laser beam to read the QR code (registered trademark) to thereby execute a job.

The close button B24 is pressed when the user desires to execute a job via a normal home screen without using the output method according to the present disclosure. When the close button B24 is pressed, the controller 31 displays a home screen described in the subsequent figure on the display 33.

Figure 28:
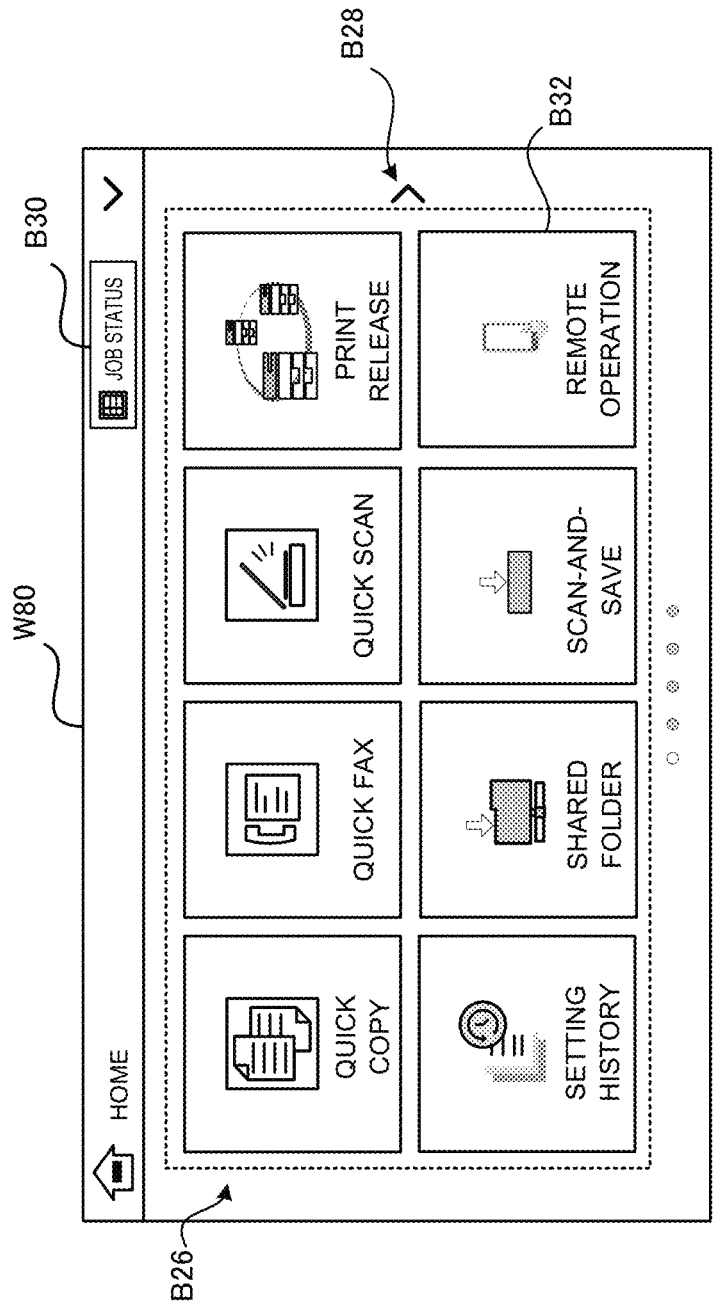
FIG. 28 is a diagram illustrating an operation example according to the third embodiment.

FIG. 28 is a diagram illustrating an example of a configuration of a home screen W80 according to the third embodiment. Note that this operation example corresponds to the process in step S440 of FIG. 23. The home screen W80 is a basic screen that receives a selection of a job and selections of various function displays by the user, for example. The home screen W80 includes job/function selection buttons B26, a display forward button B28, and a job status button B30.

The job/function selection buttons B26 receive a selection of a job, a function display, or the like, desired by the user. For example, when the user selects a "quick copy" button among the job/function selection buttons B26, the controller 31 displays a job execution screen (not illustrated) for setting the "quick copy". Furthermore, the job/function selection buttons B26 according to the third embodiment also include a remote operation button B32 to shift the screen to the display screen W70 illustrated in FIG. 27. When the user selects the remote operation button B32, the controller 31 shifts the screen display to the display screen W70 so as to enable use of the output method according to the present disclosure. Note that the display configuration example of the job/function selection buttons B26 in FIG. 28 is merely an example, and hidden job/function display buttons may be displayed by selecting the display forward button B28.

The job status button B30 receives a notification instruction input for a progress status, a reservation status, and the like, of a job that is being executed by the multifunction peripheral 70. When the user selects the job status button B30, the controller 31 displays the progress status, the reservation status, and the like of the job which are not illustrated.

Figure 29:
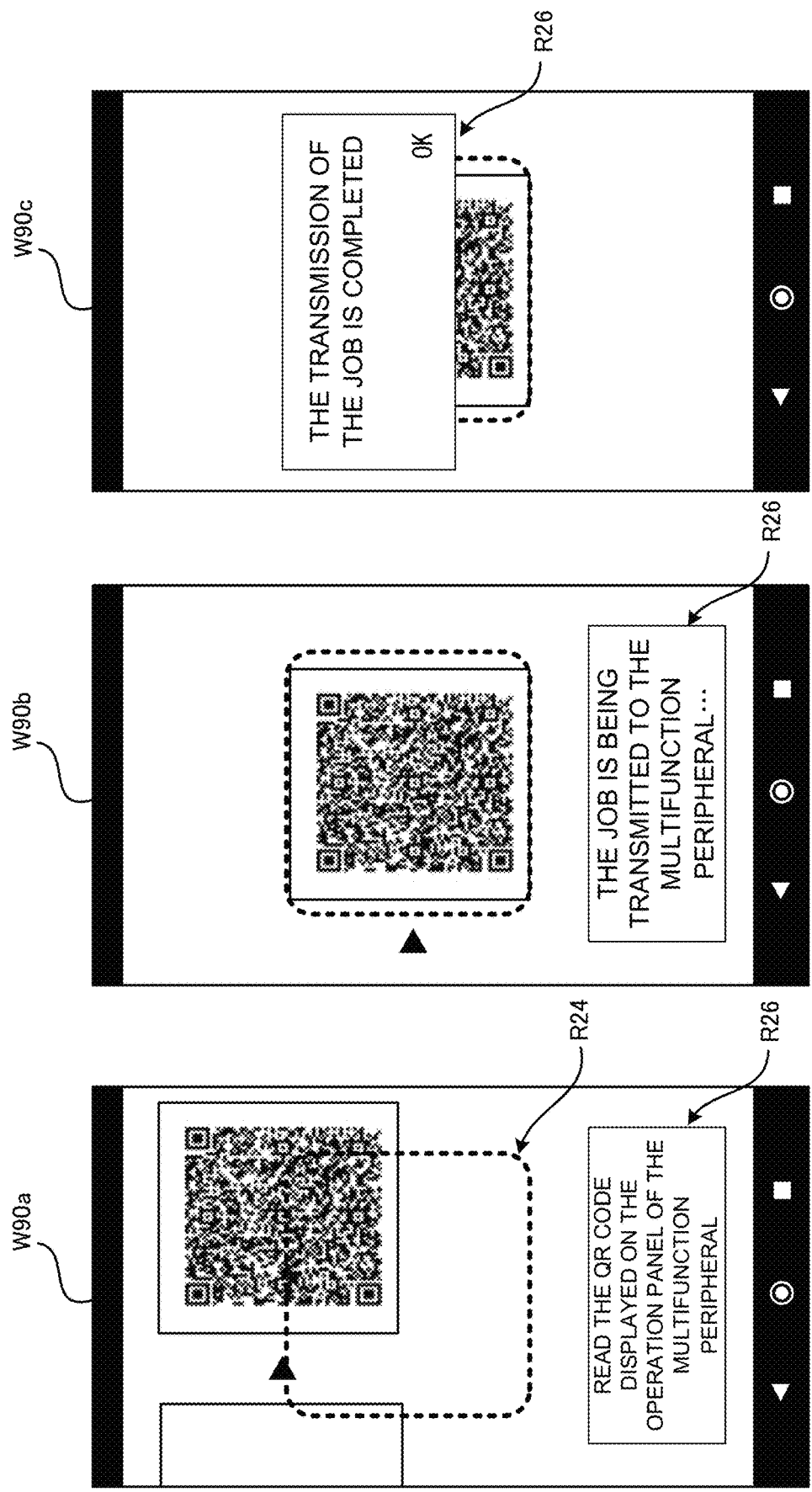
FIG. 29 is a diagram illustrating an operation example according to the third embodiment.

FIG. 29 is a diagram illustrating an example of a configuration of an apparatus information obtaining screen displayed by the controller 11 of the terminal device 50 when the start button B14 is selected on the scan job execution screen W20 and apparatus information being displayed in the multifunction peripheral 70 is obtained. An apparatus information obtaining screen W90a includes an apparatus information obtaining region R24 and a status display region R26.

As illustrated in FIG. 29, the apparatus information obtaining region R24 may be configured as a guideline that guides the user such that, when the apparatus information to be obtained is encoded information, such as a QR code (registered trademark), the encoded information falls within a reading region of the imaging device or the scanning device. The user operates the terminal device 50 such that the encoded information, such as a QR code (registered trademark) falls within the apparatus information obtaining region R24. When the apparatus information is obtained, the controller 11 shifts the apparatus information obtaining screen W90a to an apparatus information obtaining screen W90b.

The status display region R26 displays an operation or a progress status (status) of a job to the user. For example, in the status display region R26 of the apparatus information obtaining screen W90a, a message indicating that the QR code (registered trademark) is to be read while the QR code (registered trademark) falls within the apparatus information obtaining region R24.

After the encoded information, such as the QR code (registered trademark) is read, the status display region R26 in the apparatus information obtaining screen W90b displays a message indicating that the job is being transmitted to the multifunction peripheral 70.

After the transmission of the job to the multifunction peripheral 70 is completed, the controller 11 shifts the display screen to an apparatus information obtaining screen W90c. On the apparatus information obtaining screen W90c, a status display region R26 displays a message indicating that the transmission of the job is completed.

Figure 22:
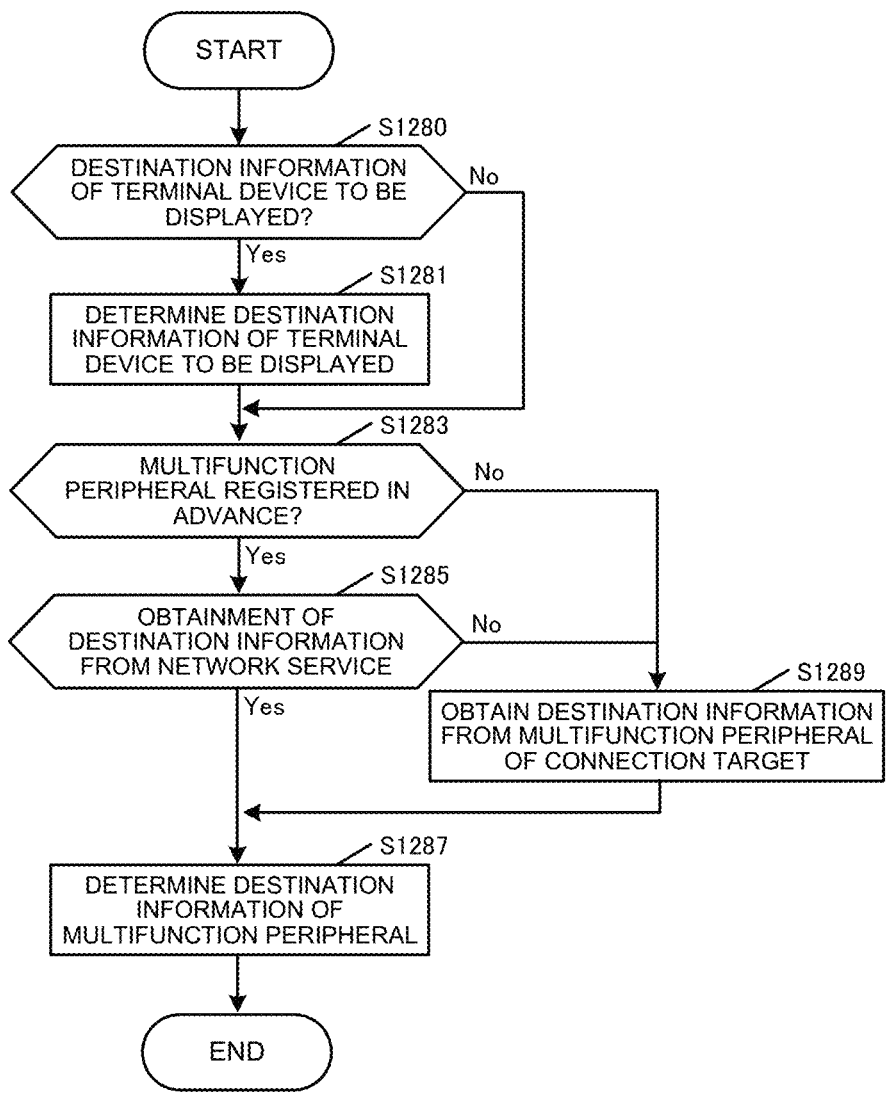
FIG. 22 is a flowchart illustrating a process of the terminal device according to the third embodiment.

FIGS. 30A to 30C are diagrams illustrating an example of operation performed when destination information is obtained from the multifunction peripheral 70 to be connected when the multifunction peripheral 70 is not registered in advance in step S1283 of FIG. 22 or when obtainment of the destination information of the multifunction peripheral 70 from the network service 90 is disabled in step S1285.

When receiving a selection of an address book selection button B16 of the scan job execution screen W20, the controller 11 of the terminal device 50 displays a modal M10. When an address book of a multifunction peripheral is selected in the modal M10 illustrated in FIG. 30A, the controller 11 displays a destination information obtaining screen W90d illustrated in FIG. 30B.

As with the apparatus information obtaining screen W90a illustrated in FIG. 29, the destination information obtaining screen W90d includes a destination information obtaining region R28 and a status display region R30. The destination information obtaining region R28 may be configured as a guideline that guides the user such that, when the destination information to be obtained is encoded information, such as a QR code (registered trademark) including folder (file) path information for accessing destination information managed by the multifunction peripheral 70, the encoded information falls within a reading region of the imaging device or the scanning device. When the encoded information falls within the reading region, the encoded information is read, and the display screen shifts from the destination information obtaining screen W90d to the destination information obtaining screen W90e illustrated in FIG. 30C.

The status display region R30 displays an operation or a destination information obtaining status (status) to the user. For example, the status display region R30 of the destination information obtaining screen W90d is an example of display of a message indicating that the QR code (registered trademark) is to be read while the QR code (registered trademark) falls within the destination information obtaining region R28. In addition, the status display region R30 in the destination information obtaining screen W90e is an example of display of a message indicating that an address book is being obtained from the multifunction peripheral 70.

Figure 31:
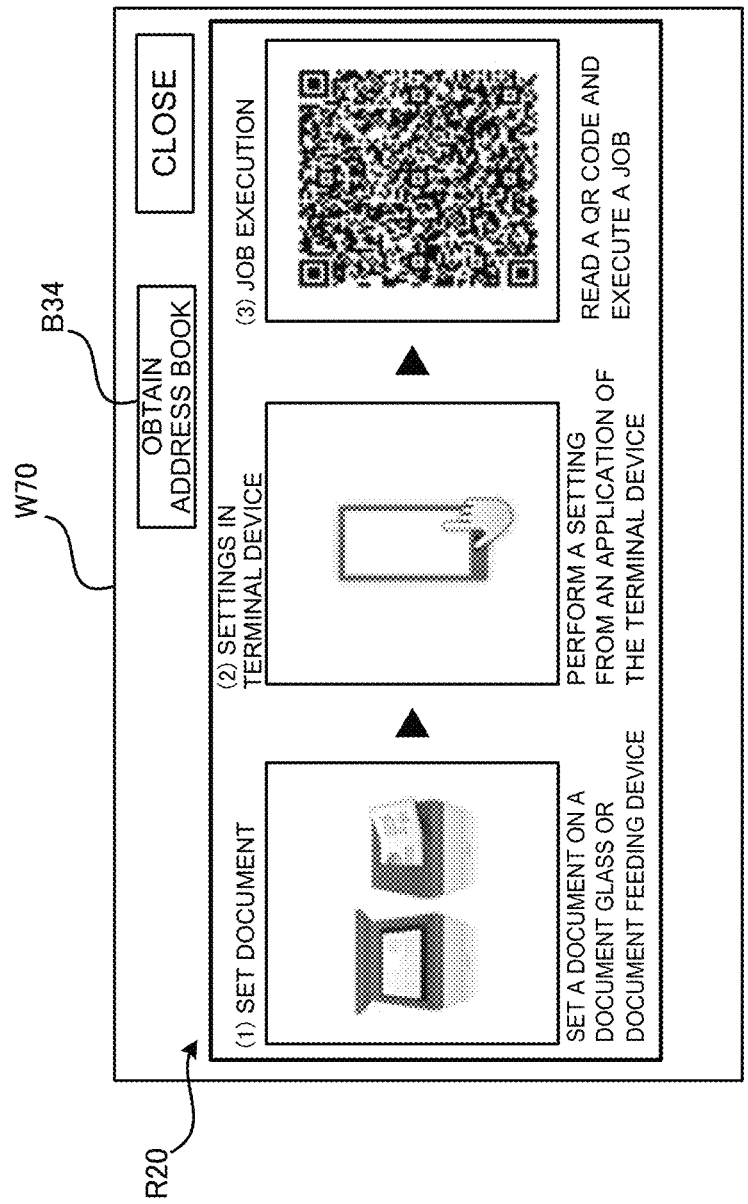
FIG. 31 is a diagram illustrating an operation example according to the third embodiment.

Note that the QR code (registered trademark) for obtaining destination information includes folder (file) path information for accessing the destination information managed by the multifunction peripheral 70 embedded therein may be displayed by selecting an address book obtaining button B34 that accepts an instruction for displaying a QR code (registered trademark) for obtaining destination information provided on the display screen W70, for example, as illustrated in FIG. 31. Note that, at this time, the QR code (registered trademark) for job execution may be displayed along with the QR code (registered trademark) for obtaining destination information.

Alternatively, only one QR code (registered trademark) may be displayed on the display screen W70, and when information pertaining to execution of a job is not included in the information transmitted from the terminal device 50 in step S132 of FIG. 21, control may be performed so that destination information is obtained.

Note that, although the folder (file) path information for accessing destination information managed by the multifunction peripheral 70 is embedded in the QR code (registered trademark) for obtaining destination information in FIGS. 30 and 31, destination information may be directly embedded in the QR code (registered trademark) for obtaining the destination information.

Figure 32:
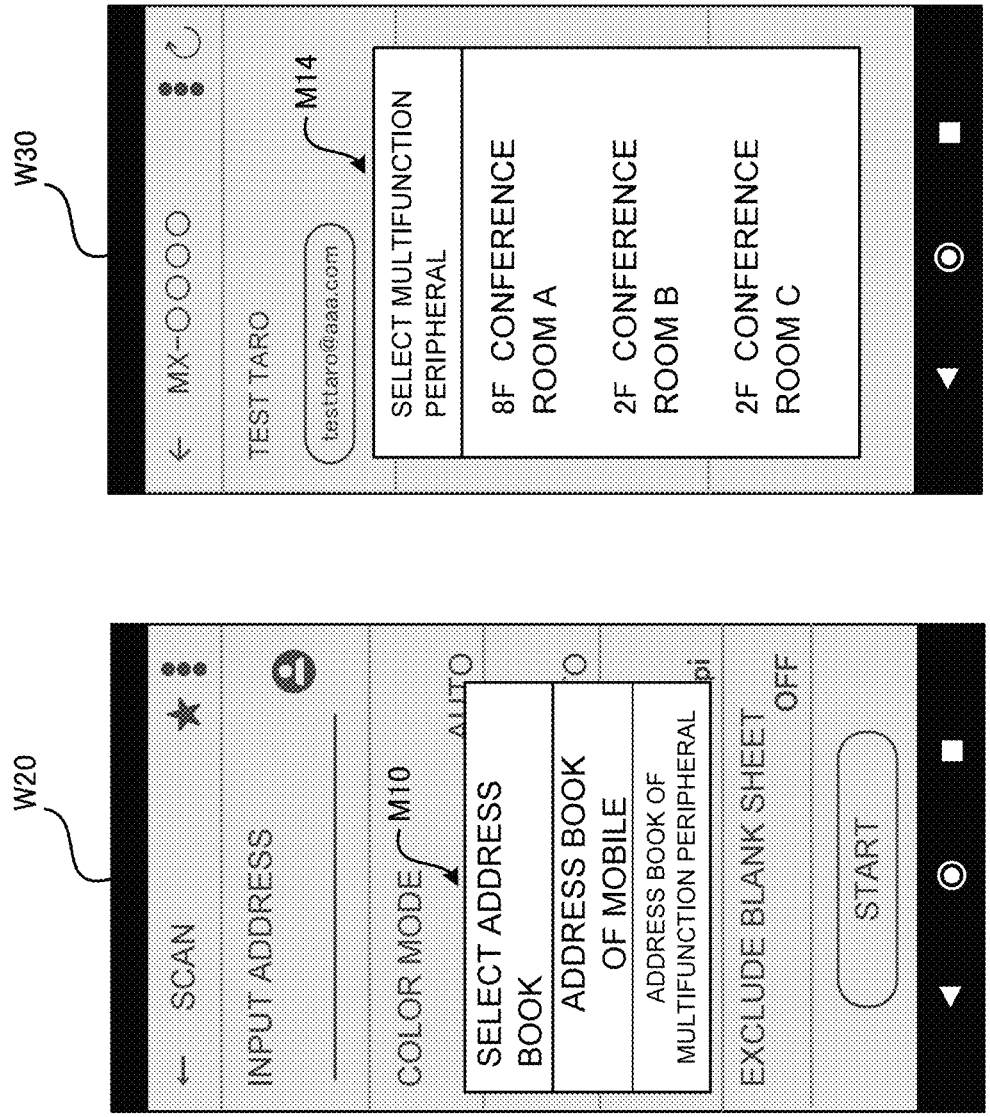
FIG. 32 is a diagram illustrating an operation example according to the third embodiment.

FIG. 32 is a diagram illustrating an example of a display of a multifunction peripheral selection screen displayed when the multifunction peripheral 70 is not managed by the network service 90 in step S1285 of FIG. 22, that is, when the multifunction peripheral 70 to which destination information may not supplied from the network service 90 exists.

When the selection of the address book selection button B16 on the scan job execution screen W20 is performed, the controller 11 of the terminal device 50 displays the modal M14 as a multifunction peripheral selection screen in which multifunction peripherals 70 to which destination information may not be supplied ("2F conference room B" or "2F conference room C", for example) are grayed out when a selection of "address book of a multifunction peripheral" is received in a state in which the modal M10 is displayed.

Since the multifunction peripheral 70 that may not receive destination information is grayed out, the user may recognize the multifunction peripheral 70 capable of obtaining destination information.

As described above, according to the third embodiment, the address book serving as the destination information managed by the multifunction peripheral 70 may be obtained through the network service 90, in addition to the address boom managed by itself, using the scan job execution screen W20 of the terminal device 50 and an e-mail address or the like of a user recorded in the address book may be set.

The present disclosure is not limited to the above-described embodiments, and various modifications can be made. That is, the technical scope of the present disclosure also includes embodiments that may be obtained by combining technical measures that are modified as appropriate without departing from the gist of the present disclosure.

Furthermore, although the above-described embodiments include some parts described separately for convenience of explanation, it is needless to say that the embodiments may be combined within a technically possible range and implemented.

In addition, the program to be operated on each of the devices in the embodiments is a program that controls the CPU or the like (i.e., a program which makes a computer function) so as to implement the functions of the above-described embodiments. According to the embodiment, it is assumed that the device simultaneously executes a plurality of programs as needed by multitask processing. The information handled by the devices is temporarily accumulated in a temporary storage device (for example, a RAM) during processing of the information, and then, is stored in various storage devices such as a read-only memory (ROM) and an HDD, and is read, modified, and written by the CPU as necessary.

A recording medium used for storing the program may be any one of a semiconductor medium (for example, a ROM, a non-volatile memory card, or the like), an optical recording medium or a magnetooptical recording medium (for example, a digital versatile disc (DVD), a magnetooptical disc (MO), a mini disc (MD), a compact disc (CD), a Blu-ray (registered trademark) disc (BD), or the like), and a magnetic recording medium (for example, a magnetic tape, a flexible disk, or the like). Moreover, not only are the functions of the embodiments described above implemented by execution of a loaded program, but the functions of the present disclosure may also be implemented by processing performed in cooperation with an operating system, other application programs, or the like, on the basis of an instruction of the program.

Furthermore, when the program is to be distributed to the market, the program may be stored in a portable recording medium for distribution or transferred to a server computer connected via a network such as the Internet. In this case, a storage device of the server computer is, as a matter of course, included in the present disclosure.

What is claimed is:

1. An output system comprising: an image processing apparatus including a job controller that controls execution of a transmission job, which sends image data using destination information, and a first storage that is capable of storing the destination information; and
a terminal device including a display capable of displaying a reception screen that accepts settings of the transmission job, a controller capable of outputting the transmission job to the image processing apparatus based on the settings of the transmission job accepted through the reception screen, an obtainer capable of transmitting a request for obtaining the destination information to the image processing apparatus and obtaining the destination information from the image processing apparatus, and a second storage capable of storing the destination information, wherein
the controller displays, on the display, the destination information stored in the second storage and the destination information obtained from the first storage in a selectable manner, and outputs the transmission job using the destination information selected by a user to the image processing apparatus, wherein
the controller further displays, on the display, the terminal device and another image processing apparatus available for the registration of the destination information in response to selection instructions of the destination information obtained from the image processing apparatus, and
the controller is capable of registering the destination information obtained from the image processing apparatus in the terminal device or the other image processing apparatus.

2. The output system according to claim 1, further comprising:
a network service, wherein
the image processing apparatus further generates apparatus information including connection information on a connection of an apparatus to the network service, and displays the generated apparatus information for the terminal device,
the terminal device further transmits the connection information included in the generated apparatus information and the settings of the transmission job to the network service, and
the job controller further executes the transmission job obtained through the network service.

3. The output system according to claim 2, wherein the apparatus information is encoded using one or more of a two-dimensional code, a one-dimensional code, a character, a symbol, and a number.

4. The output system according to claim 1, wherein the controller further performs a filtering process on the destination information obtained from the image processing apparatus in accordance with a predetermined condition and displays resulting destination information.

5. The output system according to claim 1, wherein
the second storage is capable of further storing registration information of at least one of image processing apparatuses, including the image processing apparatus, and
the controller further displays the destination information obtained from the image processing apparatus based on the registration information.

* * * * *